US012013675B2

(12) United States Patent
Satonaka et al.

(10) Patent No.: US 12,013,675 B2
(45) Date of Patent: Jun. 18, 2024

(54) NETWORK SYSTEM, INFORMATION PROCESSING DEVICE, AND INFORMATION PROCESSING METHOD

(71) Applicant: OMRON Corporation, Kyoto (JP)

(72) Inventors: Sayaka Satonaka, Kyoto (JP); Masatoshi Takahara, Kyoto (JP)

(73) Assignee: OMRON Corporation, Kyoto (JP)

( * ) Notice: Subject to any disclaimer, the term of this patent is extended or adjusted under 35 U.S.C. 154(b) by 390 days.

(21) Appl. No.: 17/627,689

(22) PCT Filed: Feb. 19, 2020

(86) PCT No.: PCT/JP2020/006476
§ 371 (c)(1),
(2) Date: Jan. 17, 2022

(87) PCT Pub. No.: WO2021/024519
PCT Pub. Date: Feb. 11, 2021

(65) Prior Publication Data
US 2022/0244696 A1  Aug. 4, 2022

(30) Foreign Application Priority Data
Aug. 2, 2019 (JP) .................. 2019-143216

(51) Int. Cl.
*G05B 19/05* (2006.01)
*H04L 41/0677* (2022.01)

(52) U.S. Cl.
CPC ......... *G05B 19/052* (2013.01); *G05B 19/058* (2013.01); *H04L 41/0677* (2013.01);
(Continued)

(58) Field of Classification Search
CPC ................ G05B 19/052; G05B 19/058; G05B 2219/1214; G05B 2219/14098; H04L 41/0677
See application file for complete search history.

(56) References Cited

U.S. PATENT DOCUMENTS 5,844,795 A    12/1998 Johnston et al.
9,778,638 B2 * 10/2017 Kato .................. H04L 12/403
(Continued)

FOREIGN PATENT DOCUMENTS

CN    102035679    4/2011
CN    102255975    11/2011
(Continued)

OTHER PUBLICATIONS

"Search Report of Europe Counterpart Application", issued on Jun. 22, 2023, pp. 1-10.
(Continued)

*Primary Examiner* — Duc C Ho
(74) *Attorney, Agent, or Firm* — JCIPRNET

(57) ABSTRACT

Each of communication control units that perform communication using EtherNet/IP executes data processing for reading of a state value stored in a state value management unit and/or writing of the state value to the state value management unit on the basis of first setting information, and executes exchange of frame data including the state value with the communication control unit of a communication partner on the basis of second setting information. If one communication control unit has failed the data processing, this information processing device displays, on a display, the first setting information of the one communication control unit and the second setting information of the communication control unit in a comparable manner, and if a pair of communication control units have failed exchange of frame data, the information processing device displays, on the display, the second setting information of one communication control unit and connection information in a comparable manner.

14 Claims, 21 Drawing Sheets

(52) U.S. Cl.
CPC .............. *G05B 2219/1214* (2013.01); *G05B 2219/14098* (2013.01)

(56) References Cited

U.S. PATENT DOCUMENTS

| | | | |
|---|---|---|---|
| 10,686,624 B2* | 6/2020 | Senda | .................... H04L 43/10 |
| 10,739,745 B1* | 8/2020 | Kretschmann | ....... H05K 7/1464 |
| 2014/0336784 A1 | 11/2014 | Senda et al. | |
| 2016/0036626 A1 | 2/2016 | Bale et al. | |
| 2017/0170983 A1 | 6/2017 | Iwai et al. | |
| 2018/0101159 A1 | 4/2018 | Nagatomo et al. | |

FOREIGN PATENT DOCUMENTS

| | | |
|---|---|---|
| CN | 108572628 | 9/2018 |
| CN | 109388107 | 2/2019 |
| CN | 110050237 | 7/2019 |
| EP | 3021526 | 5/2016 |
| JP | 2005129026 | 5/2005 |
| JP | 2013126128 | 6/2013 |
| JP | 2013161106 | 8/2013 |
| JP | 2018124697 | 8/2018 |
| JP | 2019110455 | 7/2019 |
| JP | 2019179476 | 10/2019 |
| WO | 2015111174 | 7/2015 |

OTHER PUBLICATIONS

Weng, Jian-Nian et al., "On Embedded Arm-Based Modbus /TCP Protocol and its Implementation", Computer Application and Software, Oct. 2009, submit with English abstract, pp. 1-4.

Yang, Jian, "Application of Industrial Ethernet in Automated Logistics Warehouse Control System", China's High-tech Enterprises, Jul. 2010, pp. 1-2.

Edmund Julien Spatariu et al, "Intelligent system with remote transmission for monitoring telecommunication equipment parameters", 2015 IEEE 21st International Symposium for Design and Technology in Electronic Packaging (SIITME), Oct. 2015, pp. 1-6.

"Office Action of China Counterpart Application", issued on Feb. 25, 2023, with English translation thereof, pp. 1-14.

"International Search Report (Form PCT/ISA/210) of PCT/JP2020/006476," mailed on Apr. 28, 2020, with English translation thereof, pp. 1-4.

"Written Opinion of the International Searching Authority (Form PCT/ISA/237) of PCT/JP2020/006476," mailed on Apr. 28, 2020, with English translation thereof, pp. 1-8.

"Office Action of Japan Counterpart Application" with English translation thereof, issued on Jun. 27, 2023, p. 1-p. 4.

* cited by examiner

| Status | Connection status | Tag status | Output tag set | Input tag set | EtherNet information |
|---|---|---|---|---|---|
| | Connection name | | | Type | |
| ○ | 192.168.250.1 defrault_001 | | | InputOnly | |
| ⊘ | 192.168.250.1 defrault_002 | | | InputOnly | |
| ○ | 192.168.250.1 defrault_001 | | | InputOnly | |
| ○ | 192.168.250.1 defrault_001 | | | InputOnly | |
| ○ | 192.168.250.1 defrault_001 | | | InputOnly | |
| ○ | 192.168.250.1 defrault_001 | | | InputOnly | |
| ○ | 192.168.250.1 defrault_001 | | | InputOnly | |
| ○ | 192.168.250.1 defrault_001 | | | InputOnly | |
| ○ | 192.168.250.1 defrault_001 | | | InputOnly | |

Usage rate | Device band usage situation : ○○%
Unit permission communication bandwidth : ○△%

FIG. 9

NETWORK SYSTEM, INFORMATION PROCESSING DEVICE, AND INFORMATION PROCESSING METHOD

CROSS-REFERENCE TO RELATED APPLICATION

This application is a 371 application of the International PCT application serial no. PCT/JP2020/006476, filed on Feb. 19, 2020, which claims the priority benefits of Japan Patent Application No. 2019-143216, filed on Aug. 2, 2019. The entirety of each of the above-mentioned patent applications is hereby incorporated by reference herein and made a part of this specification.

TECHNICAL FIELD

The present disclosure relates to a network system, an information processing device, and an information processing method.

BACKGROUND ART

In the related art, as disclosed in Japanese Patent Laid-Open No. 2013-126128 (Patent Literature 1), an EtherNet/IP specification is known. EtherNet/IP is a standard specification of an industrial Ethernet promoted by Open DeviceNet Vendor Association (ODVA). A basis of EtherNet/IP is a technology of EtherNET (registered trademark) which is widespread.

In EtherNet/IP, cyclic communication between programmable logic controllers (PLCs) or cyclic communication between a PLC and a device other than a PLC can be executed. Such communication is also called a "data link."

In the data link, one node (a PLC or the like) included in a network requests opening of a communication line called a connection. A node side requesting opening of a connection is referred to as an "originator." A node side requested to open the connection is referred to as a "target."

When a communication line is established (that is, connection information is set), an originator exchanges frame data with a target which is a communication partner. The connection information is shared by both the nodes.

A PLC includes a communication control unit (an EtherNet/IP controller) that executes communication using EtherNet/IP and a state value management unit (an IO manager) that is connected to the communication control unit and manages a state value.

CITATION LIST

Patent Literature

Patent Literature 1: Japanese Patent Laid-Open No. 2013-126128

SUMMARY OF INVENTION

Technical Problem

The communication control unit of each of the originator and the target executes data processing (writing on a memory and reading from the memory) with a state value management unit of the self-device based on setting information determined in advance. The communication control unit of each of the originator and the target executes communication (data link) with the communication control unit of a communication partner based on connection information and setting information for the self-device set separately from the connection information.

In this way, the above-described setting information determined in advance is first necessarily consistent with the above-described setting information for the self-device. Second, the setting information for the self-device is necessarily consistent with the connection information.

Therefore, for example, when a network starts up, the originator and the target cannot communicate with each other in some cases because of inconsistency within the above-described information. In these cases, it is necessary for a network administrator or the like to check content of each piece of information by individually opening screens on which each piece of information is displayed one by one on the support device. Therefore, the network administrator is required to take time and effort to search for occurrence causes of communication errors.

The present disclosure has been devised in view of the foregoing problems and an objective of the present disclosure is to easily identify a cause of a communication error in a network in which frame data is exchanged between PLCs (control devices) in which a connection is set using EtherNet/IP.

Solution to Problem

According to an aspect of the present disclosure, a network system includes a plurality of control devices and an information processing device. Each of the plurality of control devices includes a communication control unit that executes communication using EtherNet/IP and a state value management unit that is connected to the communication control unit and manages a state value. Of the plurality of communication control units, each of a pair of communication control units set to communicate with each other by opening a connection is configured to execute data processing of at least one of reading of a state value stored in the state value management unit connected to the communication control unit and writing of a state value on the state value management unit based on first setting information set for the communication control unit. Each of the pair of communication control units is configured to execute exchange of frame data including the state value with a communication control unit of a communication partner based on second setting information set for the communication control unit and connection information for opening the connection. The first setting information and the second setting information are individually generated for each of the pair of communication control units in the information processing device and transmitted from the information processing device to each of the pair of communication control units. When at least one communication control unit in the pair of communication control units has failed the data processing, the information processing device displays the first setting information of the one communication control unit and the second setting information of the one communication control unit in a comparable manner on a display. When the pair of communication control units have failed the exchange of the frame data, the information processing device displays the second setting information of one communication control unit in the pair of communication control units and the connection information in a comparable manner on the display.

Preferably, when at least one communication control unit in the pair of communication control units has failed the data processing, the one communication control unit may write flag information indicating failure of the data processing on the state value management unit connected to the one communication control unit. When the pair of communication control units have failed the exchange of the frame data, at least one communication control unit in the pair of communication control units writes flag information indicating the failure of the exchange of the frame data on the state value management unit connected to the one communication control unit. The information processing device acquires the flag information from the state value management unit and displays the first setting information of the one communication control unit and the second setting information of the one communication control unit in a comparable manner on the display when the failure of the data processing is detected based on the flag information, and the information processing device displays the second setting information of the one communication control unit and the connection information in a comparable manner on the display when the failure of the exchange of the frame data is detected based on the flag information.

Preferably, the frame data includes a plurality of sub-frames. When the failure of the data processing is detected, the information processing device displays names of variables considered to be the sub-frames and data sizes of the variables as the first setting information of the one communication control unit and displays names of the sub-frames and data sizes of the sub-frames as the second setting information of the one communication control unit.

Preferably, when the failure of the exchange of the frame data is detected, the information processing device displays a name of the frame and a data size of the frame as the second setting information of the one communication control unit. The connection information includes the name of the frame and the data size of the frame.

Preferably, the information processing device displays a list of the plurality of control devices on the display. When it is detected that the one communication control unit has failed the data processing, the information processing device displays a first control device including the one communication control unit among the plurality of control devices in the list in a different mode from the other control devices on the display.

Preferably, when it is detected that the one communication control unit has failed the data processing, the information processing device displays the first control device including the one communication control unit and a second control device including the other communication control unit paired with the one communication control unit among the plurality of control devices in the list in a different mode from the other control devices on the display.

Preferably, when it is detected that the one communication control unit has failed the exchange of the frame data, the information processing device displays the first control device in the list in a different mode from the other control devices on the display.

Preferably, based on selection of the first control device including the one communication control unit, the information processing device displays a first screen including the first control device and a second control device including the other communication control unit paired with the one communication control unit among the plurality of control devices on the display. Based on the flag information, the information processing device displays the first screen such that whether the failure is the failure of the data processing or the failure of the exchange of the frame data is distinguishable.

Preferably, the information processing device displays a pre-decided message when it is detected that a link between the first and second control devices is in an OFF state.

Preferably, the information processing device displays a pre-decided message when the second control device is not findable.

Preferably, the information processing device changes a display position of an object image indicating occurrence of abnormality on the first screen in a case of the failure of the data processing, a case of the failure of the exchange of the frame data, a case of the OFF state of the link, and a case in which the control device is not findable.

Preferably, when the failure of the data processing is detected, the information processing device displays a second screen for changing the second setting information of the one communication control unit on the display based on reception of a pre-decided manipulation. When the failure of the exchange of the frame data is detected, the information processing device displays a third screen for changing the second setting information of the one communication control unit on the display based on reception of a pre-decided manipulation.

According to another aspect of the present disclosure, an information processing device is capable of communicating with each of a plurality of control devices. Each of the plurality of control devices includes a communication control unit that executes communication using EtherNet/IP and a state value management unit that is connected to the communication control unit and manages a state value. Of the plurality of communication control units, each of a pair of communication control units set to communicate with each other by opening a connection is configured to execute data processing of at least one of reading of a state value stored in the state value management unit connected to the communication control unit and writing of a state value on the state value management unit based on first setting information set for the communication control unit and is configured to execute exchange of frame data including the state value with a communication control unit of a communication partner based on second setting information set for the communication control unit and connection information for opening the connection. The information processing device includes: a generation unit configured to individually generate the first setting information and the second setting information for each of the pair of communication control units; a transmission unit configured to transmit the generated first setting information and second setting information to each of the pair of communication control units; and a display control unit configured to display, when at least one communication control unit in the pair of communication control units has failed the data processing, the first setting information of the one communication control unit and the second setting information of the one communication control unit in a comparable manner on the display, and configured to display, when the pair of communication control units have failed the exchange of the frame data, the second setting information of one communication control unit in the pair of communication control units and the connection information in a comparable manner on the display.

According to still another aspect of the present disclosure, an information processing method is performed in an information processing device capable of communicating with each of a plurality of control devices. Each of the plurality of control devices includes a communication control unit that executes communication using EtherNet/IP and a state value management unit that is connected to the communication control unit and manages a state value. Of the plurality of communication control units, each of a pair of communication control units set to communicate with each other by opening a connection is configured to execute data processing of at least one of reading of a state value stored in the state value management unit connected to the communication control unit and writing of a state value on the state value management unit based on first setting information set for the communication control unit and is configured to execute exchange of frame data including the state value with a communication control unit of a communication partner based on second setting information set for the communication control unit and connection information for opening the connection. The information processing method includes: a step of individually generating the first setting information and the second setting information for each of the pair of communication control units; a step of transmitting the generated first setting information and second setting information to each of the pair of communication control units; a step of displaying, when at least one communication control unit in the pair of communication control units has failed the data processing, the first setting information of the one communication control unit and the second setting information of the one communication control unit in a comparable manner on the display; and a step of displaying, when the pair of communication control units have failed the exchange of the frame data, the second setting information of one communication control unit in the pair of communication control units and the connection information in a comparable manner on the display.

Effects of Invention

According to the present disclosure, it is possible to easily identify a cause of a communication error in a network in which frame data is exchanged between control devices in which a connection is set using EtherNet/IP.

BRIEF DESCRIPTION OF DRAWINGS

FIG. 9 is a diagram illustrating a screen displayed after an icon is selected on a screen of FIG. 8.

DESCRIPTION OF EMBODIMENTS

Figure 1:
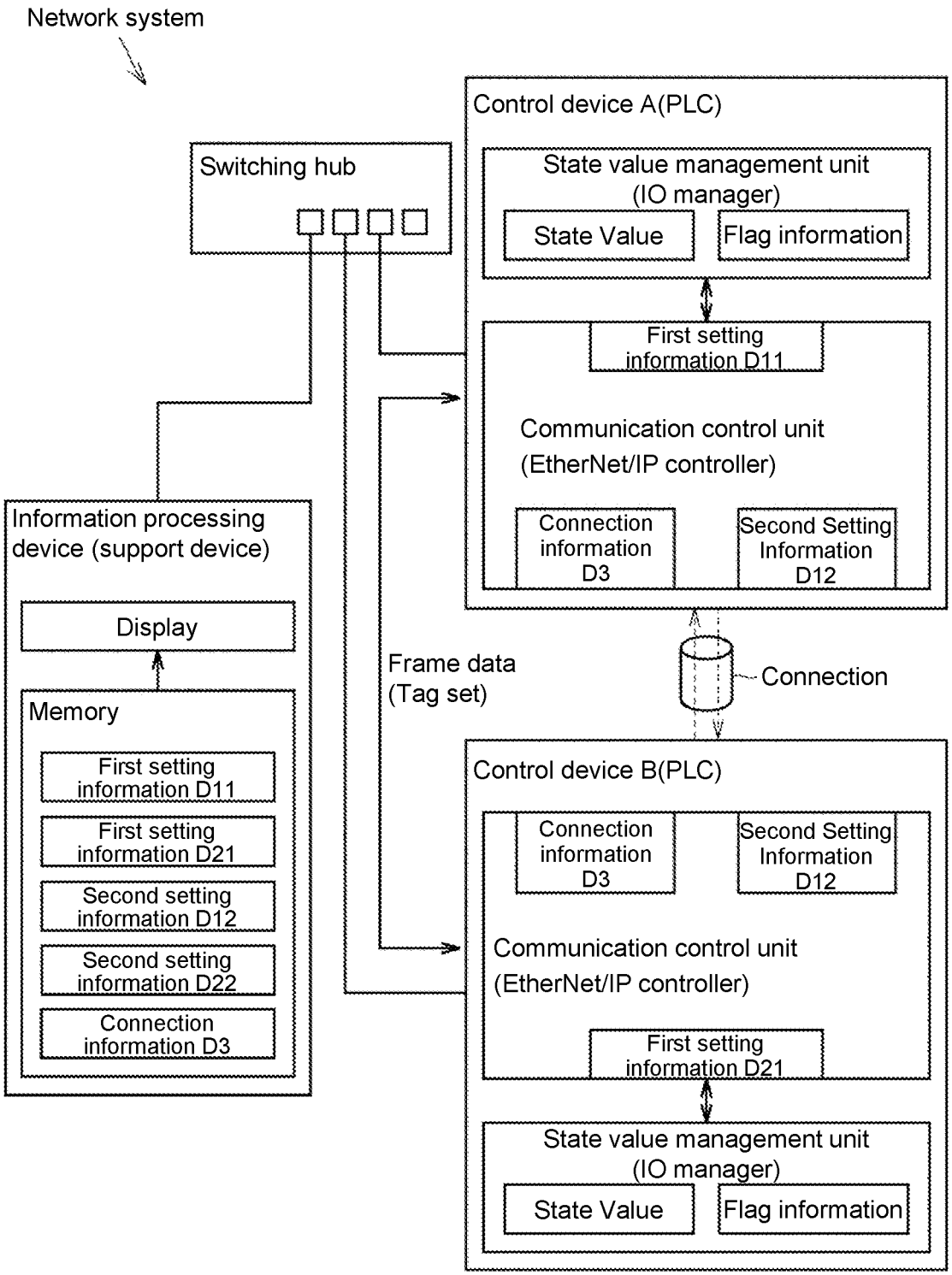
FIG. 1 is a diagram illustrating an exemplary configuration of a network system.

Hereinafter, embodiments of the present disclosure will be described with reference to the drawings. In the following description, the same reference numerals are given to the same components. The same applies to the same names and functions. Accordingly, detailed description of them will not be repeated.

In the present specification, "state value" is a term referring to a value which can be observed in any control target, and can include, for example, a physical value which can be measured by any sensor or an ON/OFF state of a relay, a switch, or the like. The "state value" can further include an instruction value of a position, a speed, a torque, or the like given to a servo driver by a PLC or a variable value used for calculation by the PLC.

§ 1 Application Example

FIG. 1 is a diagram illustrating an exemplary configuration of a network system.
Referring to FIG. 1, the network system includes an information processing device (a support device), a switching hub, and a plurality of control devices (programmable logic controllers (PLCs)). In FIG. 1, two control devices A and B configuring the plurality of control devices are illustrated for convenience.

Each of the plurality of control devices (the control devices A and B or the like) includes a communication control unit (an EtherNet/IP controller) that performs communication using EtherNet/IP and a state value management unit (an IO manager) that is connected to the communication control unit and manages a state value.

Of the plurality of communication control units, the communication control unit of the control device A and the communication control unit of the control device B are set to communicate with each other by opening a connection.

For example, when the control device A requests the control device B to open a connection and thus a communication line is established, the control device A (referred to as an "originator") exchanges frame data with the control device B which is a communication partner (also referred to as a "target"). The connection information is shared between the originator and the target.

The communication control unit of the control device A is configured to execute data processing of at least one of reading of a state value stored in the state value management unit (the state value management unit of the control device A) connected to the communication control unit and writing of the state value on the state value management unit based on first setting information D11 set for the communication control unit. The communication control unit of the control device A is configured to execute exchange of frame data including the state value with the communication control unit of the communication partner (the communication control unit of the control device B) based on second setting information D12 set for the communication control unit and connection information D3 for opening the connection.

The communication control unit of the control device B is configured to execute data processing of at least one of reading of a state value stored in the state value management unit (the state value management unit of the control device B) connected to the communication control unit and writing of the state value on the state value management unit based on first setting information D21 set for the communication control unit. The communication control unit of the control device B is configured to execute exchange of frame data including the state value with the communication control unit of the communication partner (the communication control unit of the control device A) based on second setting information D22 set for the communication control unit and the connection information D3 for opening the connection.

The first setting information D11, the first setting information D21, the second setting information D12, and the second setting information D22 are individually generated for each of the communication control units (a pair of communication control units in which a connection is set) of the control devices A and B in the information processing device, and are transmitted from the information processing device to each of the communication control units of the control devices A and B.

That is, the first setting information D11 and the second setting information D12 are generated for the communication control unit of the control device A in the information processing device and are transmitted to the communication control unit of the control device A from information processing device. The first setting information D21 and the second setting information D22 are generated for the communication control unit of the control device B in the information processing device and are transmitted from the information processing device to the communication control unit of the control device B.

The generated first setting information D11, first setting information D21, second setting information D12, and second setting information D22 are stored in a memory of the support device.

The connection information D3 is generated in the information processing device and is transmitted from the information processing device to each of the communication control units of the control devices A and B. The connection information D3 is shared between the communication control units of the control devices A and B.

When at least one communication control unit in a pair of communication control units (the communication control unit of the control device A and the communication control unit of the control device B in which the connection is set) has failed the data processing, the information processing device displays the first setting information (D11 or D21) of the one communication control unit and the second setting information (D12 or D22) of the one communication control unit in a comparable manner on the display. For example, when the communication control unit of the control device A has failed the data processing, the information processing device displays the first setting information D11 of the communication control unit of the control device A and the second setting information D12 of the communication control unit of the control device A in a comparable manner on the display of the support device.

When the pair of communication control units have failed the exchange of the frame data, the information processing device displays the second setting information (D12 or D22) of one communication control unit in the pair of communication control units and the connection information D3 in a comparable manner on the display. For example, when the communication control unit of the control device A has failed the exchange of the frame data, the information processing device displays the second setting information D12 of the communication control unit of the control device A and the connection information D3 in a comparable manner on the display.

As described above, for example, when a network starts up, the originator and the target cannot communicate with each other in some cases because of inconsistency within the above-described setting information. In this case, the information processing device displays the information so that a network administrator or the like can compare (contrast) the information as follows.

(1) The first setting information D11 and the second setting information D12 are displayed in a comparable manner.

(2) The second setting information D12 and the connection information D3 are displayed in a comparable manner.

(3) The second setting information D22 and the connection information D3 are displayed in a comparable manner.

(4) The first setting information D21 and the second setting information D22 are displayed in a comparable manner.

Through such display, the network administrator or the like can reduce time and effort required to find occurrence causes of communication errors. Accordingly, according to the present application examples, it is easy to identify the causes of the communication errors in a network in which frame data is exchanged between the PLCs (the control devices) in which the connection is set using the EtherNet/IP.

§ 2 Exemplary Configuration

<A. Network System>

Figure 2:
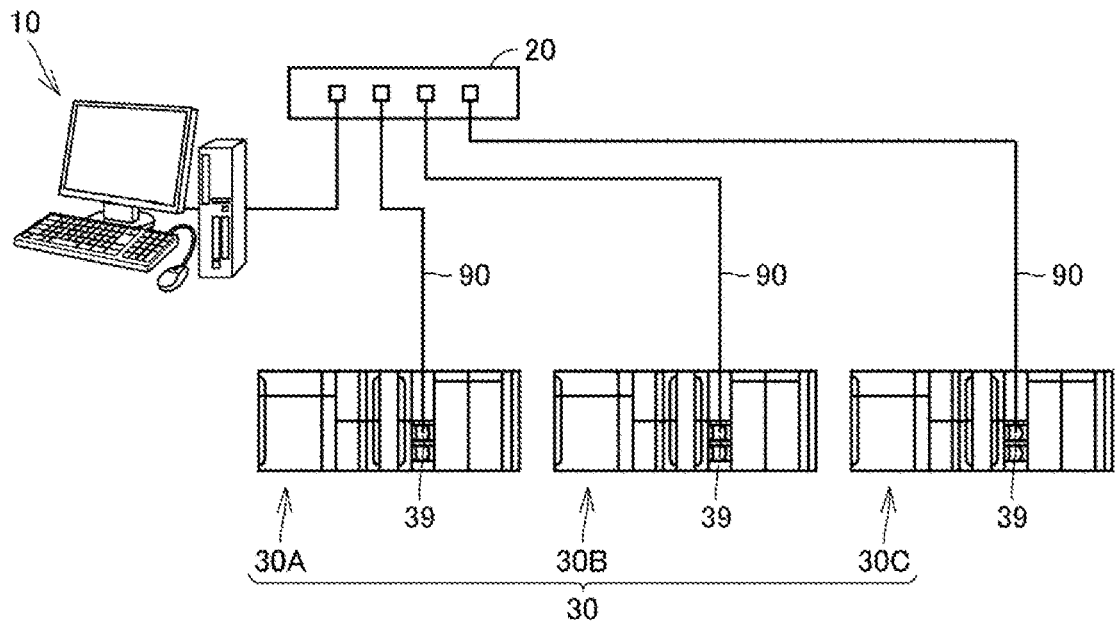
FIG. 2 is a diagram illustrating an exemplary configuration of a network system.

FIG. 2 is a diagram illustrating an exemplary configuration of a network system 1.

Referring to FIG. 2, the network system 1 includes a support device 10, a switching hub 20, and a plurality of PLCs 30 (30A, 30B, and 30C). In FIG. 2, three PLCs are described for convenience, but the number of PLCs is not limited thereto. The network system includes devices (not illustrated) other than the control devices.

The support device 10 is connected to the switching hub 20.

Each of the PLCs 30A, 30B, and 30C includes an EtherNet/IP port 39. The EtherNet/IP port 39 and a port of the switching hub 20 are connected by a communication cable 90 such as a twisted-pair cable.

<B. PLC>

Figure 3:
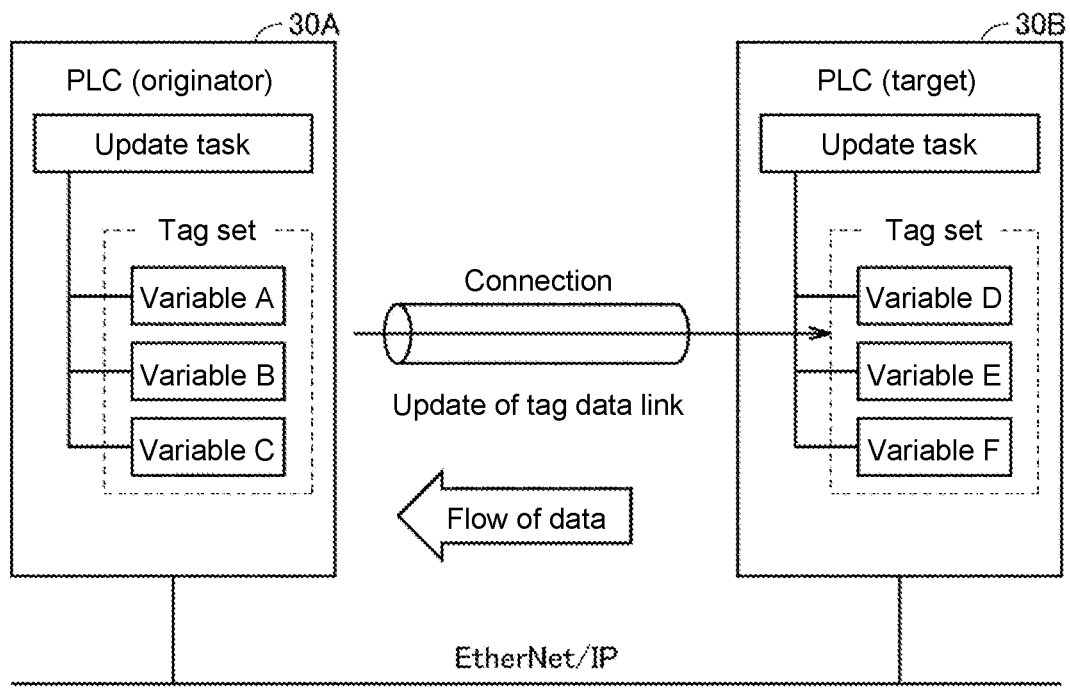
FIG. 3 is a diagram illustrating an example of cyclic communication (a data link) between a PLC and another PLC.
Figure 4:
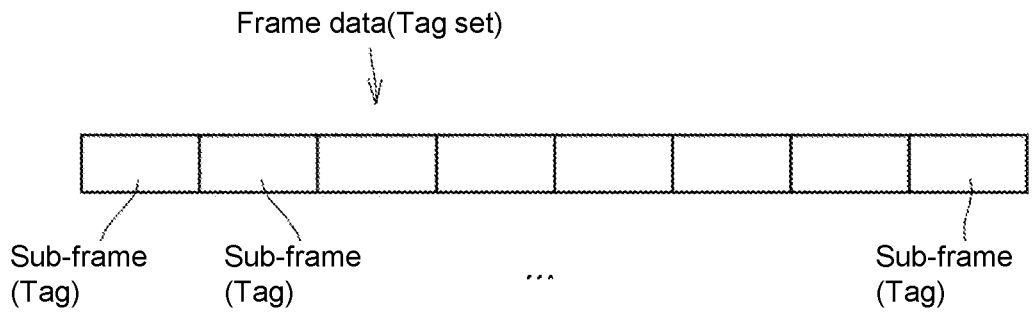
FIG. 4 is a diagram illustrating frame data exchanged in cyclic communication.

FIG. 3 is a diagram illustrating an example of a cyclic communication (data link) between the PLC 30A and the PLC 30B. FIG. 4 is a diagram illustrating frame data exchanged in cyclic communication.

Referring to FIG. 3, in this example, the PLC 30A functions as an originator and the PLC 30B functions as a target. In this example, the frame data is transmitted from the PLC 30B to the PLC 30A.

Referring to FIG. 4, the frame data includes a plurality of sub-frames. Hereinafter, the frame data is also referred to as a "tag set." The sub-frame is also referred to as a "tag."

The "tag" is a unit of a target for data exchange in a data link. The "tag set" is a unit of data for making connection in the data link. When the connection is made, one tag or a plurality of tags is summarized to configure the tag set. The tag is a member (constituent element) of the tag set.

The tag set and the tag are used to generate (set) the connection. Specifically, the support device 10 is used to generate the tag set and the tag for the communication control unit designated (registered) in advance among the plurality of communication control units (the EtherNet/IP controllers and the EtherNet/IP units). A tag of an input (reception) side and a tag of an output (transmission) side are set.

The tag is typically a variable. A global variable can be designated as a variable which can be used as a tag. The number of tags which can be included in the tag set is determined in advance. A maximum size (the number of bytes) of the tag and a maximum size (the number of bytes) of the tag set are determined in advance.

Referring back to FIG. 3, a tag set (specifically, an input (reception) tag set) is configured by three tags (variables a, b, and c) in the PLC 30A. A tag set (specifically, an output (transmission) tag set) is configured by three tags (variables d, e, and f) in the PLC 30B.

In the case of this example, a value of the variable a is updated with a value of the variable d. A value of the variable b is updated with a value of the variable e. A value of the variable c is updated with a value of the variable f.

To execute the data link, the number of tags (variables) included in the tag set of the originator side is required to match the number of tags (variables) included in the tag set of the target side. A data size of the tag set of the originator side is required to match a data size of the tag set of the target side. Further, a data size of each tag included in the tag set of the originator side is required to match a data size of each tag included in the tag set of the target side. For example, a data size of the variable a is required to match a data size of the variable d. Hereinafter, the matching of the kinds of data is referred to as "consistency."

An "update task" is a function of ensuring synchronization of the value of the global variable seen from the task of a reference side by designating only one task which can be written on the global variable and prohibiting writing of the global variable from a task other than the task.

After the tag set is generated, the above-described connection information is set by the support device 10. Specifically, a tag set and a target device opening a connection, a type of connection (multicast or unicast), a packet interval, a connection name, and the like are set as the connection information. Specifically, the connection information is set in the EtherNet/IP port 39.

More specifically, the connection is set on the originator side. A user designates a target after designating the originator in the support device 10. The user designates a tag set (an input tag set) for the designated originator and designates a tag set (an output tag set) in the designated target. The input tag set and the output tag set are associated as a connection.

Hereinafter, to facilitate description, the first setting information D11, the second setting information D12, the first setting information D21, the second setting information D22, and the connection information D3 described with reference to FIG. 1 are used for description. The first setting information D11 and the first setting information D21 are information regarding variable setting. The second setting information D12 and the second setting information D22 are information regarding a tag set.

Figure 5:
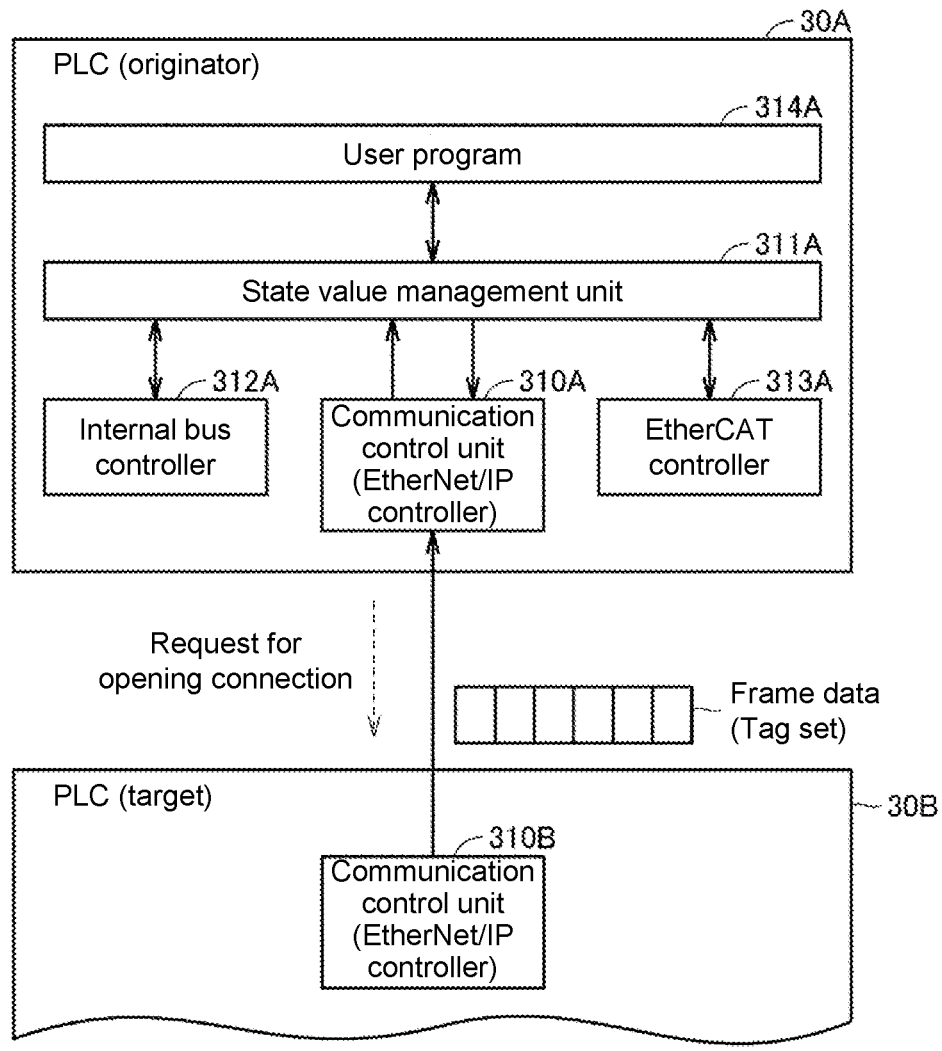
FIG. 5 is a block diagram illustrating an internal configuration of the PLC.

FIG. 5 is a block diagram illustrating an internal configuration of the PLC.

Referring to FIG. 5, the PLC 30A includes a communication control unit 310A (EtherNet/IP controller), a state value management unit 311A, an internal bus controller 312A, an EtherCAT controller 313A, and a user program 314A. The PLC 30B includes a communication control unit 310B (EtherNet/IP controller), a state value management unit (not illustrated), an internal bus controller (not illustrated), an EtherCAT controller (not illustrated), and a user program (not illustrated). Hereinafter, to facilitate description, the state value management unit of the PLC 30B is referred to as a "state value management unit 311B" to distinguish the state value management unit of the PLC 30B from the state value management unit 311A of the PLC 30A.

The state value management unit 311A has a memory region for storing a state value. The state value management unit 311A receives access from the communication control unit 310A, access from the internal bus controller 312A, access from the EtherCAT controller 313A, and access from the user program 314A. Through such access, writing of data and reading (reference) of the data are performed in the memory region.

The communication control unit 310A writes data (specifically, sub-frame data and a value of a variable (tag)) on the memory region of the state value management unit 311A and reads data from the memory region. The communication control unit 310A exchanges the frame data (the tag set) with the communication control unit 310B.

Specifically, the communication control unit 310A performs writing of data on the memory region of the state value management unit 311A and reading of data to the memory region based on the first setting information D11 set for the communication control unit 310A. The communication control unit 310A performs exchange of the frame data with the communication control unit 310B based on the second setting information D12 set for the communication control unit 310A and the connection information D3 for opening the connection.

Similarly, the communication control unit 310B performs writing of data on the memory region of the state value management unit 311B and reading of data to the memory region based on the first setting information D21 set for the communication control unit 310B. The communication control unit 310B performs exchange of the frame data with the communication control unit 310A based on the second setting information D22 set for the communication control unit 310B and the connection information D3 for opening the connection.

<C. Support Device>

(c1. Hardware Configuration)

Figure 6:
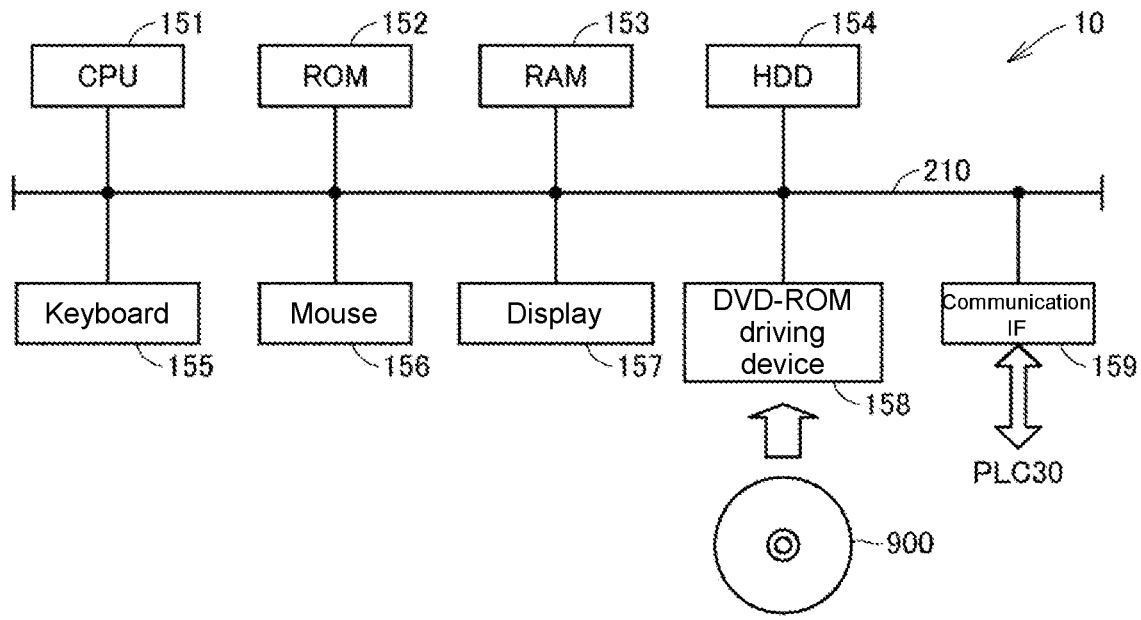
FIG. 6 is a schematic diagram illustrating a hardware configuration of a support device.

FIG. 6 is a schematic diagram illustrating a hardware configuration of the support device 10.

Referring to FIG. 6, the support device 10 is typically configured as a general-purpose computer. From the perspective of maintenance, a notebook-type personal computer excellent in portability is preferable.

The support device 10 includes a CPU 151 that executes various programs including an operating system (OS), a read-only memory (ROM) 152 that stores BIOS or various kinds of data, a memory RAM 153 that provides a working region for storing data necessary for the CPU 151 to execute a program, and a hard disk (HDD) 154 that stores a program or the like to be executed by the CPU 151 in a nonvolatile manner.

The support device 10 further includes a keyboard 155 and a mouse 156 that accept a manipulation from the user and a display 157 that presents information to the user. The support device 10 includes a communication interface (IF) 159 for communicating with the PLC 30 or the like.

As will be described below, various programs which are executed by the support device 10 are stored in a DVD-ROM 900 for distribution. The programs stored in the DVD-ROM 900 are read by a Digital Versatile Disk-Read Only Memory (DVD-ROM) driving device 158 and are stored in the hard disk (HDD) 154 or the like. Alternatively, the programs may be configured to be downloaded via a network such as a superordinate host computer or the like.

(c2. Functional Configuration)

Figure 7:
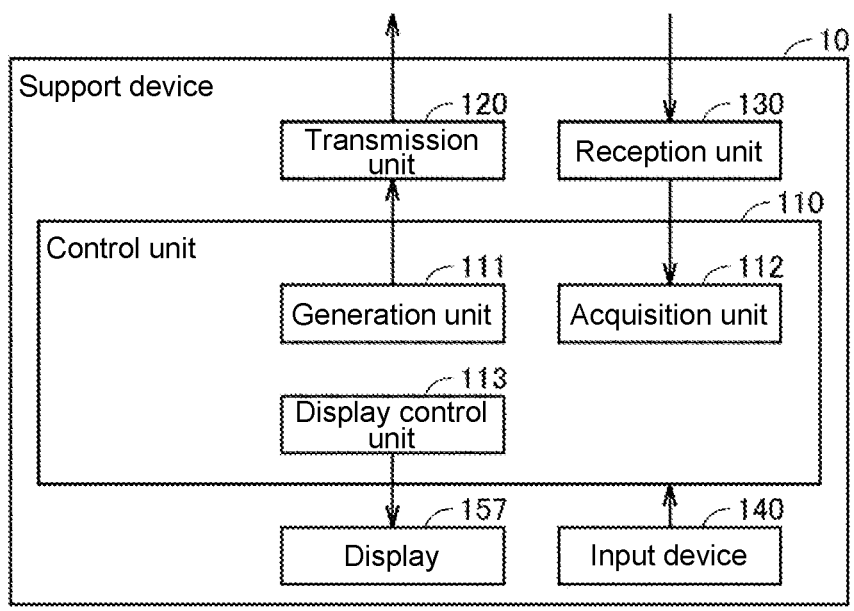
FIG. 7 is a schematic diagram illustrating a functional configuration of the support device.

FIG. 7 is a schematic diagram illustrating a functional configuration of the support device 10.

Referring to FIG. 7, the support device 10 includes a control unit 110, a transmission unit 120, a reception unit 130, an input device 140, and a display 157. The control unit 110 includes a generation unit 111, an acquisition unit 112, and a display control unit 113.

The control unit 110 controls an overall operation of the support device 10. The control unit 110 is typically implemented by allowing the operating system (OS) stored in the support device 10 to execute various application programs.

Hereinafter, as described above, the data link is established between the PLC 30A and PLC 30B. Further, a function of the support device 10 in such an aspect will be described below.

The generation unit 111 generates the above-described connection information D3 based on a user manipulation on the support device 10. The generation unit 111 generates the first setting information D11 and the second setting information D12 for the PLC 30A based on a user manipulation on the support device 10. Further, the generation unit 111 generates the first setting information D21 and the second setting information D22 for the PLC 30B based on a user manipulation on the support device 10.

Specifically, the first setting information D11 and the first setting information D21, the second setting information D12 and the second setting information D22, and the connection information D3 are generated in this order. The second setting information D12, the second setting information D22, and the connection information D3 are information generated based on a manipulation of setting a connection. The first setting information D11 and the first setting information D21 are generated in advance irrespective of whether the connection is set.

The transmission unit 120 transmits the generated first setting information D11, second setting information D12, and connection information D3 to the PLC 30A. The first setting information D11, the second setting information D12, and the connection information D3 are used by the communication control unit 310A of the PLC 30A.

The transmission unit 120 transmits the generated first setting information D21, second setting information D22, and connection information D3 to the PLC 30B. The first setting information D21, the second setting information D22, and the connection information D3 are used by the communication control unit 310B of the PLC 30B.

When the communication control unit 310A has failed the data processing (reading or writing of data) to the state value management unit 311A, the communication control unit 310A writes flag information indicating the failure of the data processing on the state value management unit 311A. Similarly, when the communication control unit 310B has failed the data processing (reading or writing of data) to the state value management unit 311B, the communication control unit 310B writes flag information indicating the failure of the data processing on the state value management unit 311B. Further, when the communication control unit 301A has failed exchange of the frame data with the communication control unit 310B, the communication control unit 310A writes the failure of the exchange of the frame data on the state value management unit 311A.

The acquisition unit 112 of the support device 10 acquires the flag information from the state value management units 311A and 311B.

When it is detected based on the acquired flag information that the communication control unit 310A has failed the data processing, the display control unit 113 causes the display to display the first setting information D11 and the second setting information D12 for the communication control unit 310A in a comparable manner.

When it is detected based on the acquired flag information that the communication control unit 310B has failed the data processing, the display control unit 113 causes the display 157 to display the first setting information D21 and the second setting information D22 for the communication control unit 310B in a comparable manner.

Further, when the failure of the exchange of the frame data is detected based on the flag information, the display control unit 113 causes the display 157 to display the second setting information D12 for the communication control unit 310A and the connection information D3 in a comparable manner.

Each display example of the above-described cases will be described below.

(c3. User Interface)

Figure 8:
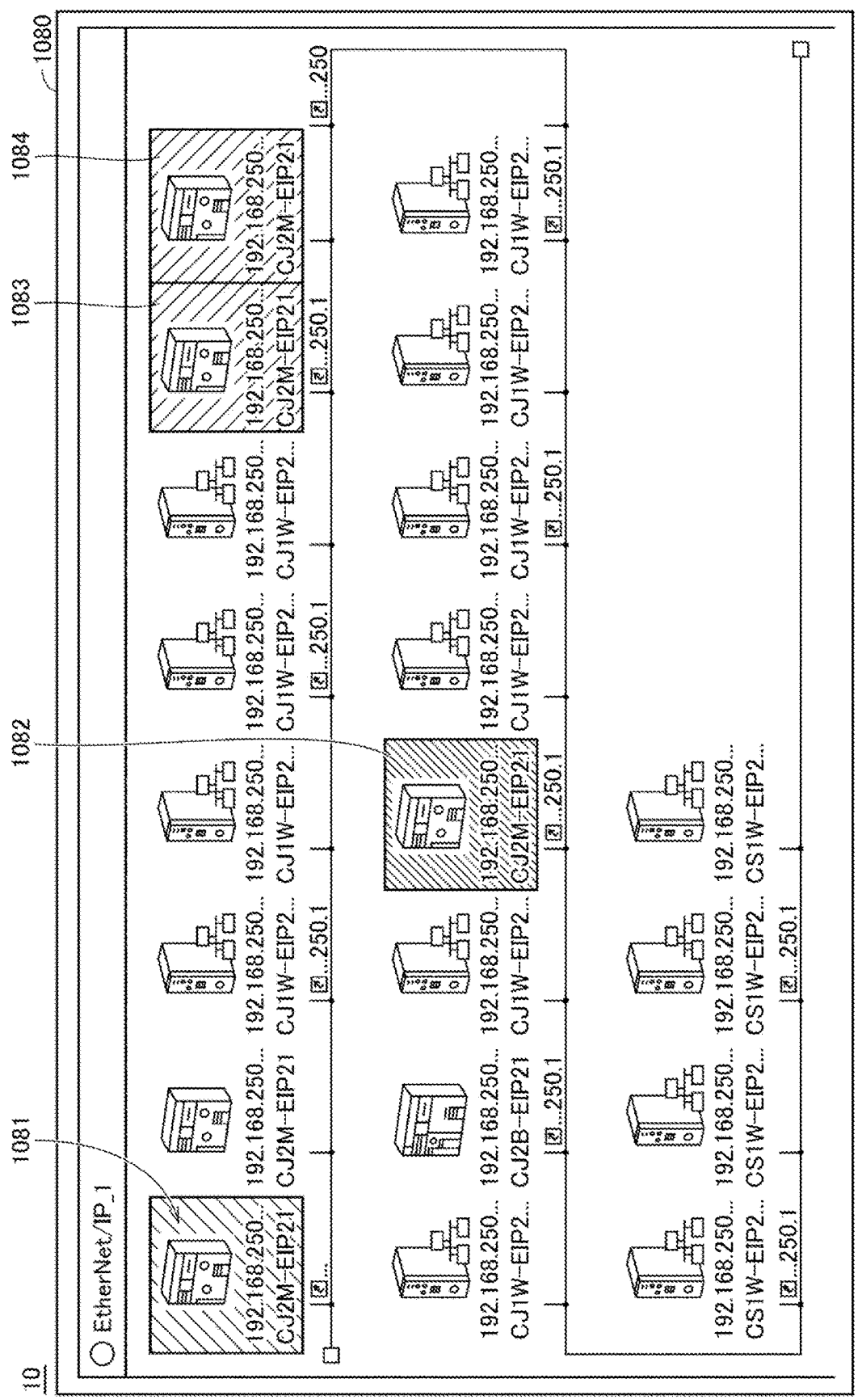
FIG. 8 is a diagram illustrating a network topology of the network system.

FIG. 8 is a diagram illustrating a network topology of the network system 1.

Referring to FIG. 8, the support device 10 displays a screen 1080 on the display 157 based on a user manipulation. The screen 1080 indicates a network topology of the network system 1. The screen 1080 shows the set connection visually. The screen 1080 indicates a list of the plurality of PLCs 30.

The support device 10 displays positions (specifically, icons indicating devices such as PLCs) at which there is abnormality in the data link (connection) in the network in a different mode from other positions.

In the case of this example, the support device 10 highlights and displays an icon 1081 at the position at which there is a problem of a physical wiring with a first color (for example, red), highlights and displays icons 1083 and 1084 at positions at which a problem of a tag has not been solved with a second color (for example, an orange color), and highlights and displays an icon 1082 at a position at which establishment of a connection has failed with a third color (for example, yellow). The fact that "a problem of a tag has not been solved" means that a problem has occurred with regard to a tag and the problem has not been solved at a present time point. The problem of the tag also includes a problem of a tag set.

For example, the icon 1083 indicates the PLC 30A (originator) and the icon 1084 indicates the PLC 30B (a target from the viewpoint of the PLC 30A) (see FIG. 5). As another example, the icon 1083 indicates the PLC 30A and the icon 1084 indicates the PLC 30 other than the PLC 30B (specifically, the PLC 30 which does not correspond to a target from the viewpoint of the PLC 30A).

The support device 10 preferably highlights and displays a position at which abnormality with high priority has occurred (for example, a position at which there is a problem of a physical wiring) with a color attracting an intention of a user.

In an icon of the target, a self-IP address and an IP address of the originator in which the connection is set are displayed.

When a device configured in the network topology is pinged and there is no response, the support device 10 determines that there is a problem of a physical wiring in the device. The support device 10 highlights and displays an icon indicating this device with the first color, as described above.

When there is a response to the pinging from the device and the target is absent or there is no connection point, the support device 10 highlights and displays an icon indicating this device as a failure of the establishment of the connection with the second color, as described above.

The fact that "the problem of the tag has not been solved (a failure of the tag solution)" means that a variable necessary in the tag set is not defined, the data sizes of the tags (variables or sub-frames) do not match each other, the data sizes of the tag sets (the frame data) do not match, or the like. As the failure of the tag solution, there are a failure of the tag solution on the originator side and a failure of the tag solution on the target side.

The network topology illustrated in FIG. 8 is generated through a user manipulation executed using the support device 10.

FIG. 9 is a diagram illustrating a screen displayed after the icon 1084 is selected on the screen 1080 of FIG. 8.

Referring to FIG. 9, the support device 10 displays a screen 1090 on the display 157. The PLC 30 indicated by the icon 1084 has the connection set with the plurality of other PLCs 30.

The screen 1090 shows content associated with tabs such as a connection status and tag status and tabs in a selection state. In this example, content of the connection status is shown as the screen 1090.

The connection status includes information regarding a connection name and a type. A circle to the left of each connection name indicates kinds of abnormality and normality with color. For example, a circle of first data 1091 from the top indicates normality. A circle of second data 1092 from the top indicates abnormality. Circles of data after the third data indicate normality. Further, each piece of data of the connection status is configured to be selectable.

The tag status includes a tag name, information indicating each input/output, and status information (for example, normality solution completion). In the tag status, a circle indicating normality or abnormality is displayed to the left of each tag name as in the connection status. Each piece of data of the tag status is also configured to be selectable.

Figure 10:
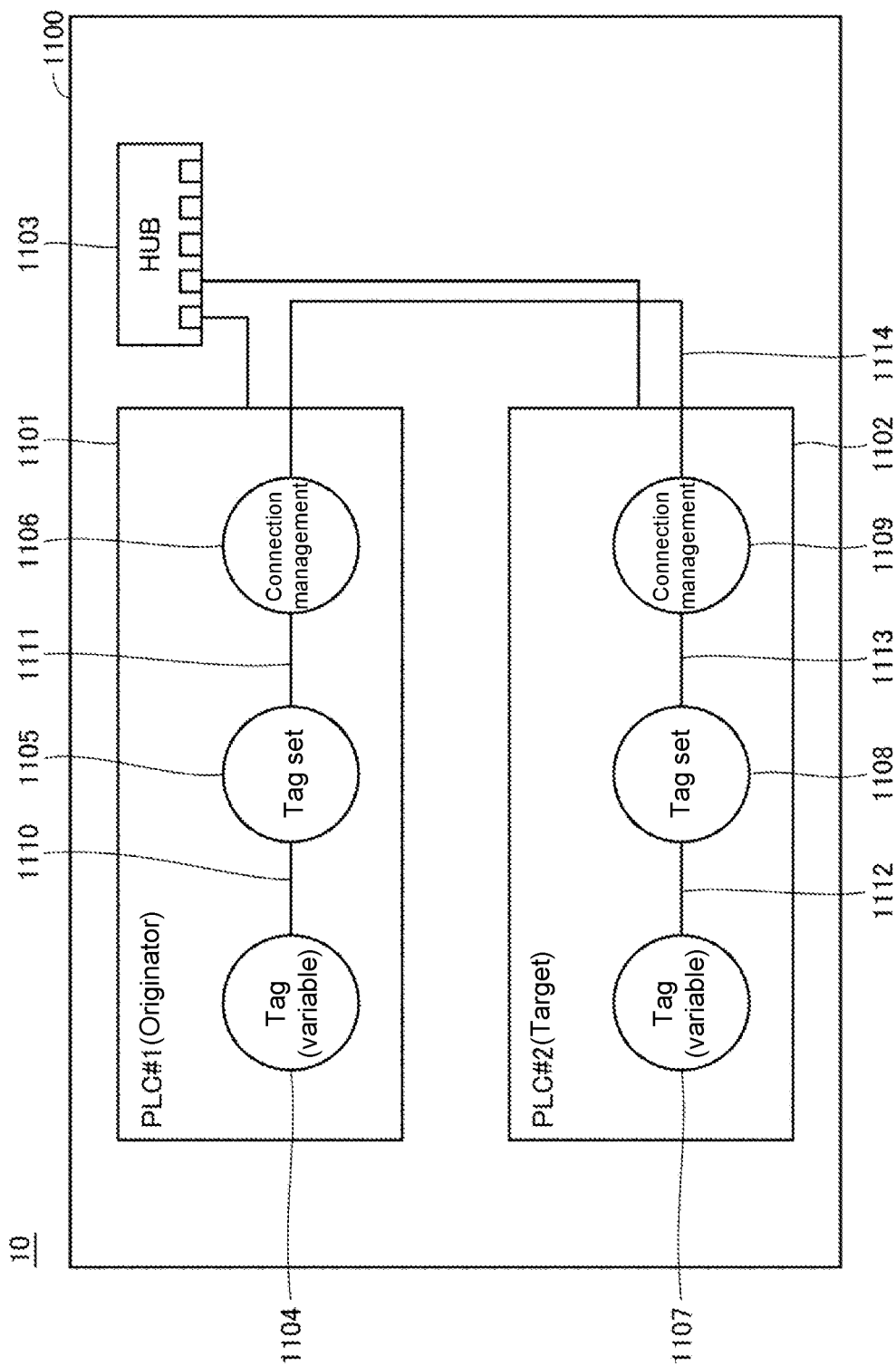
FIG. 10 is a diagram illustrating a screen displayed after data on the screen illustrated in FIG. 9 is selected.

FIG. 10 is a diagram illustrating a screen displayed after the data 1091 on the screen 1090 illustrated in FIG. 9 is selected.

Referring to FIG. 10, the support device 10 displays a screen 1100 on the display 157. In the screen 1100, an object image 1101 of the PLC which is an originator related to selected data, an object image 1102 of the PLC which is a target, and an object image 1103 which is a switching hub are displayed on the display 157.

The object image 1101 includes a circular object image 1104 indicating a tag, a circular object image 1105 indicating a tag set, and a circular object image 1106 indicating connection management. The object images 1104 and 1105 are connected to each other by a line segment image 1110. The object images 1105 and 1106 are connected to each other by a line segment image 1111.

Similarly, the object image 1102 includes a circular object image 1107 indicating a tag, a circular object image 1108 indicating a tag set, and a circular object image 1109 indicating connection management. The object images 1107 and 1108 are connected to each other by a line segment image 1112. The object images 1108 and 1109 are connected to each other by a line segment image 1113.

Further, the object image 1106 inside the object image 1101 and the object image 1109 inside the object image 1102 are connected to each other by a line segment image 1114.

Figure 11:
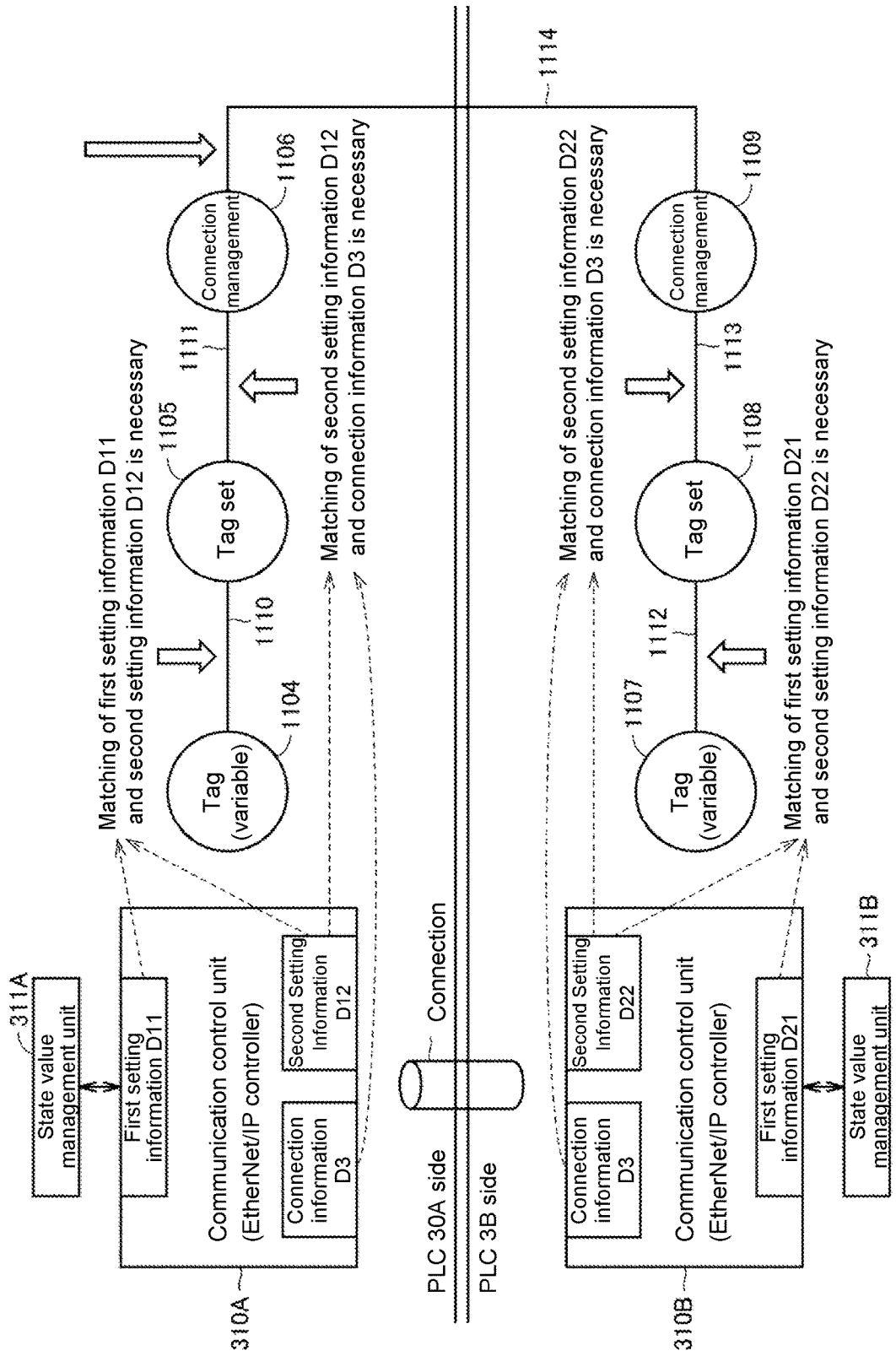
FIG. 11 is a diagram illustrating relevancy between circular object images connected by line segment images of FIG. 10.

FIG. 11 is a diagram illustrating relevancy between circular object images connected by line segment images of FIG. 10.

Referring to FIG. 11, the consistency between the tag indicated by the object image 1104 and the tag set indicated by the object image 1105 is consistency between the first setting information D11 and the second setting information D12 of the PLC 30A. When there is no consistency (no matching) between the first setting information D11 and the second setting information D12, a pre-decided object image (for example, a sign such as a x mark) is displayed on the line segment image 1110 connecting the object image 1104 to the object image 1105 (see FIG. 13).

The consistency between the tag set indicated by the object image 1105 and the connection management indicated by the object image 1106 is consistency between the second setting information D12 and the connection information D3 of the PLC 30A. When there is no consistency (no matching) between the second setting information D12 and the connection information D3, a pre-decided object image (for example, a sign such as a x mark) is displayed on the line segment image 1111 connecting the object image 1105 to the object image 1106 (see FIG. 17).

The consistency between the tag indicated by the object image 1107 and the tag set indicated by the object image 1108 is consistency between the first setting information D21 and the second setting information D22 of the PLC 30B. When there is no consistency (no matching) between the first setting information D21 and the second setting information D22, a pre-decided object image (for example, a sign such as a x mark) is displayed on the line segment image 1112 connecting the object image 1107 to the object image 1108.

The consistency between the tag set indicated by the object image 1108 and the connection management indicated by the object image 1109 is consistency between the second setting information D22 and the connection information D3 of the PLC 30B. When there is no consistency (no matching) between the second setting information D22 and the connection information D3, a pre-decided object image (for example, a sign such as a x mark) is displayed on the line segment image 1111 connecting the object image 1108 to the object image 1109. For example, under the condition that there is no tag set in the target, a pre-decided object image (for example, a sign such as a x mark) is displayed on the line segment image 1111 (see FIGS. 22 and 23).

Further, when the establishment of the connection has failed, a pre-decided object image (for example, a sign such as a x mark) is displayed on the line segment image 1114 connecting the object image 1106 to the object image 1109. As a reason why the establishment of the connection has failed, link OFF abnormality, absence of the target, and the like can be exemplified.

Figure 12:
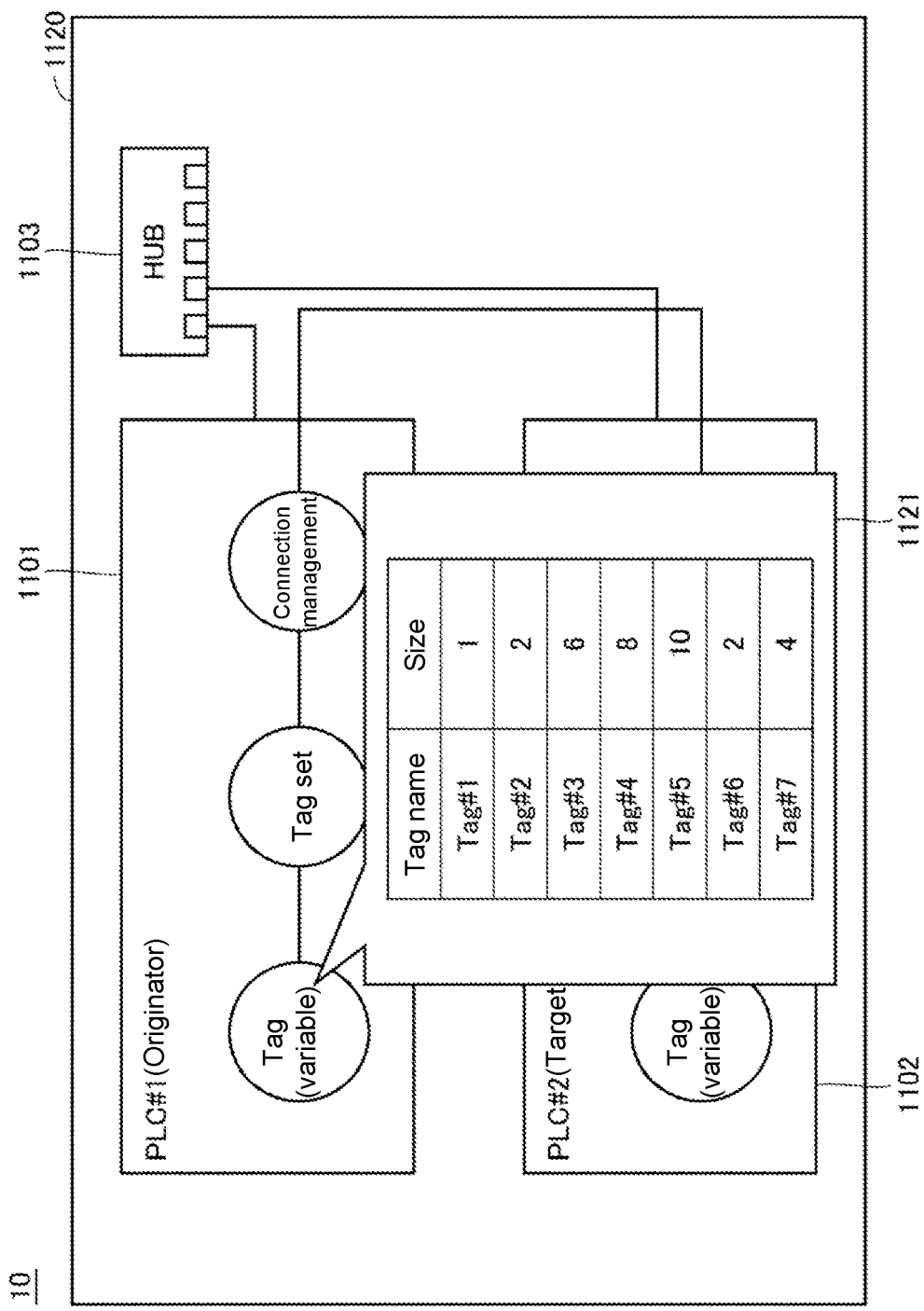
FIG. 12 is a diagram illustrating a screen displayed when a user selects an object image on a screen of FIG. 10.

FIG. 12 is a diagram illustrating a screen displayed when a user selects an object image 1104 on the screen 1100 of FIG. 10.

Referring to FIG. 12, when the object image 1104 is selected, the support device 10 displays a list of tags associated with the object image 1104 in a display form such as pop-up. The list of the tags includes tag names and data sizes.

In this configuration, an administer or the like of the network system (specifically, a user of the support device) can easily know the name of a tag exchanged between the PLCs 30 and the data size of the tag. Hereinafter, the "administrator or the like of the network system" is simply referred to as a "user."

Hereinafter, a screen (user interface) displayed on the display 157 of the support device 10 when abnormality occurs with regard to a connection will be described with reference to the drawings. To facilitate description, the following screen display will be described appropriately referring to the content illustrated in FIG. 11. Specifically, a case in which abnormality occurs in the connection between the PLC 30A and the PLC 30B on the assumption that two connected PLCs 30 are PLC 30A and the PLC 30B will be described as an example. The "abnormality" is a case in which there is a problem of a physical wiring, a case in which a problem of a tag has not been solved, and/or a case in which establishment of a connection has failed, as described above.

(1) First Case

Figure 13:
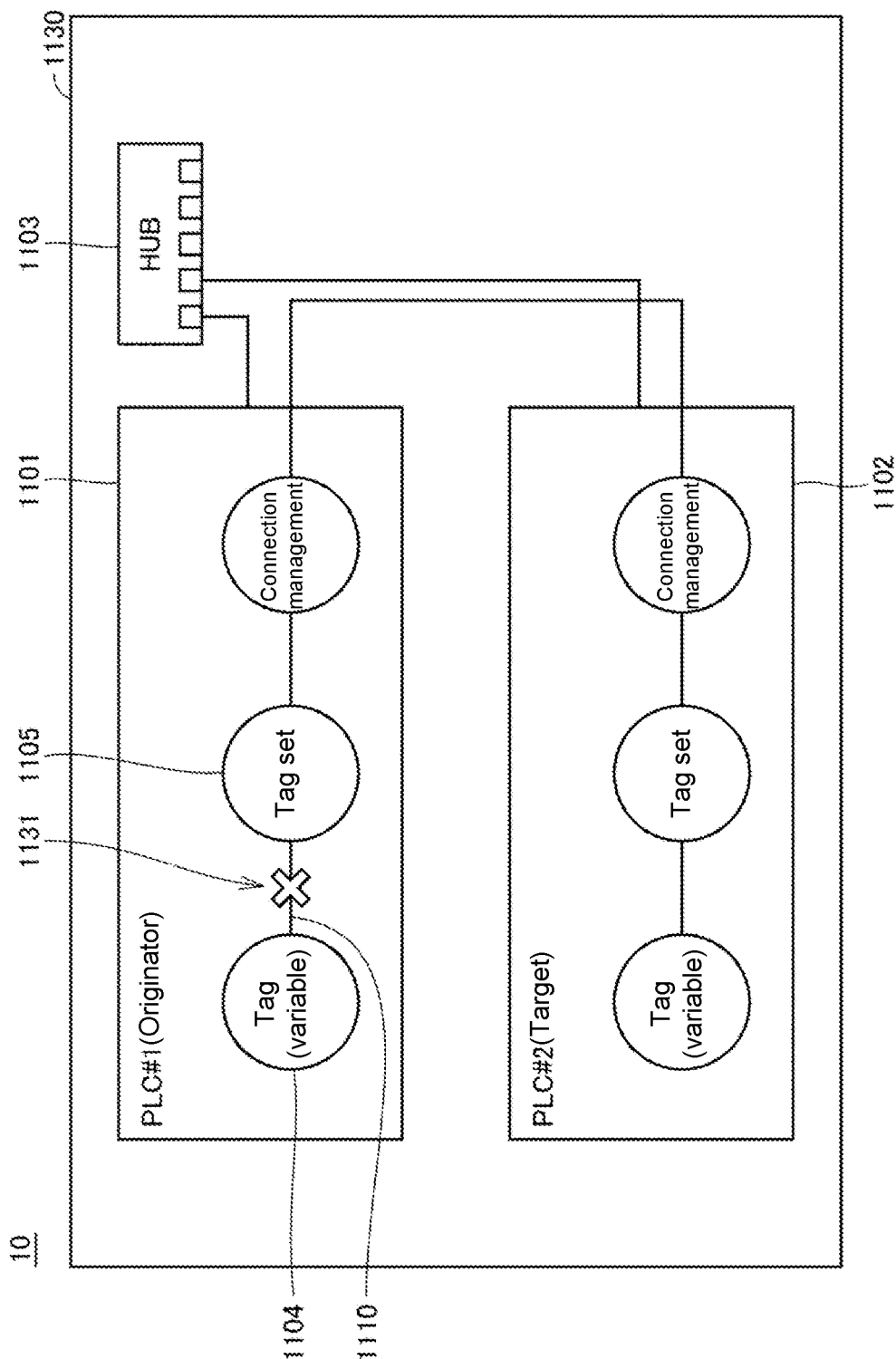
FIG. 13 is a diagram illustrating a screen displayed after data on the screen illustrated in FIG. 9 is selected.

FIG. 13 is a diagram illustrating a screen displayed after data (for example, the data 1092) on the screen 1090 illustrated in FIG. 9 is selected. That is, FIG. 13 illustrates a screen displayed when a problem of a tag has not been solved. Specifically, FIG. 13 illustrates a screen example of a case in which there is no consistency between the first setting information D11 and the second setting information D12 of the PLC 30A of the originator side, as illustrated in FIG. 11.

Referring to FIG. 13, since there is no consistency between the first setting information D11 and the second setting information D12, the support device 10 displays an object image 1131 (in this example, a sign such as a x mark) on the line segment image 1110 connecting the object image 1104 to the object image 1105.

Through such display, the user can know that the problem of the tag has not been solved on the PLC 30A side.

Figure 14:
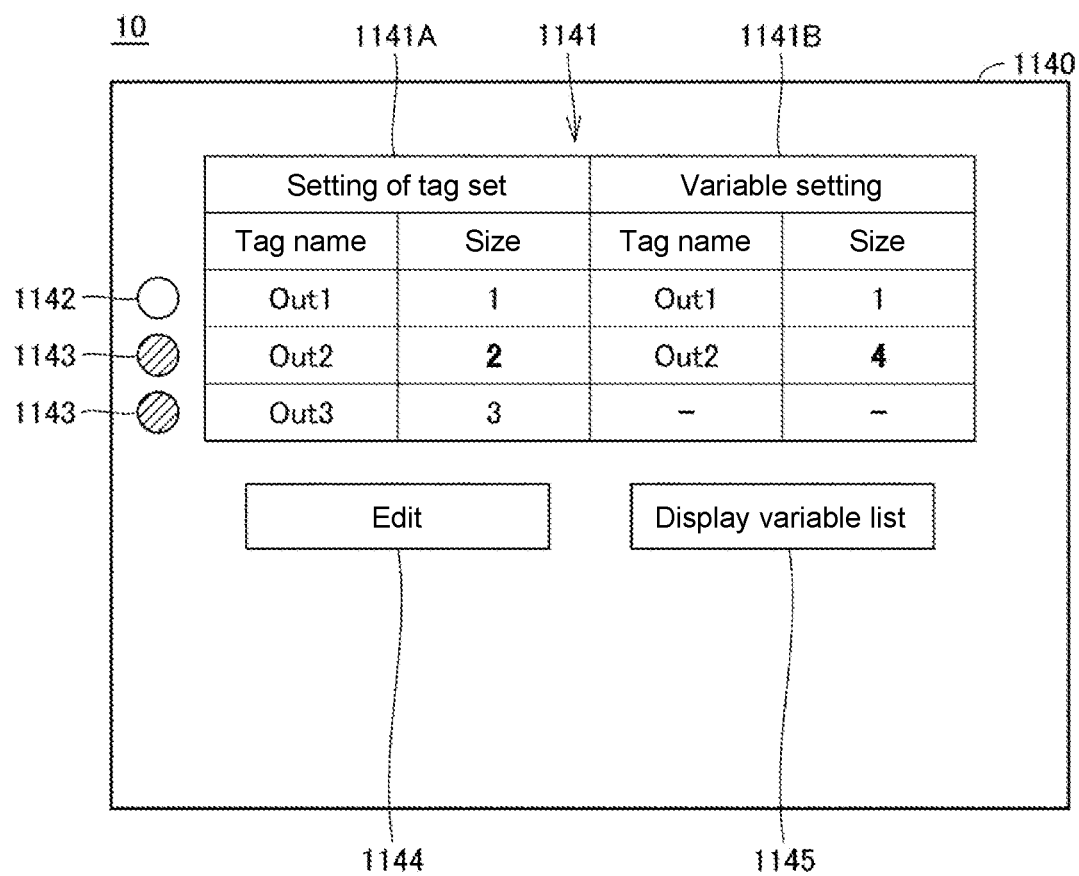
FIG. 14 is a diagram illustrating a screen displayed when a support device receives a manipulation of selecting an object image.

FIG. 14 is a diagram illustrating a screen displayed when the support device 10 receives a manipulation of selecting the object image 1131.

Referring to FIG. 14, the support device 10 displays a screen 1140 on the display 157. The screen 1140 includes a data table 1141 and object images 1142, 1143, 1144, and 1145. The data table 1141 includes a table 1141A indicating the second setting information D12 and a table 1141B indicating the first setting information D11.

In the table 1141A, the name of each tag included in the tag set generated through a manipulation of generating the second setting information D12 (setting of a tag set) and a data size of each tag associated with the name of the tag are displayed. Further, an object image 1142 indicating normality and an object image 1143 indicating abnormality (warning) are displayed in association to the left of the name of each tag.

In the table 1141B, the name of each tag set through a manipulation of generating the first setting information D11 (variable setting) and a data size of each tag associated with the name of the tag are displayed.

In the case of this example, since a data size of a tag "Out2" of the setting of the tag set does not match a data size of the tag "Out2" of the variable setting, the support device 10 displays an object image 1143 indicating abnormality to the left of such data.

In the case of this example, since there is no tag of the variable setting corresponding to a tag "Out3" of the setting of the tag set, the support device 10 displays the object image 1143 indicating abnormality to the left of the data of "Out3."

In this way, according to the screen 1140, the user can easily know that the problem of the tag has not been solved due to a certain cause (specifically, what is not consistent) with regard to the setting of the tag.

Figure 15:
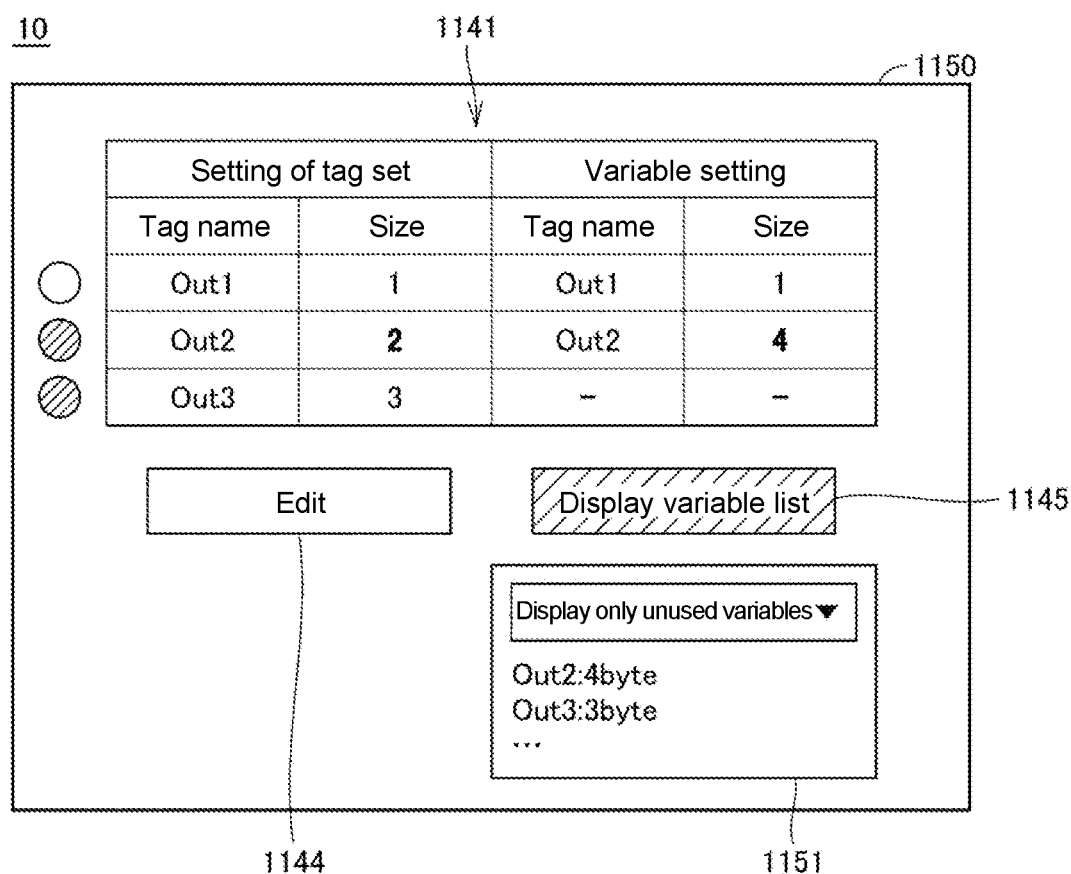
FIG. 15 is a diagram illustrating a screen displayed when the object image is selected on the screen of FIG. 14.

FIG. 15 is a diagram illustrating a screen displayed when the object image 1145 is selected on the screen 1140 of FIG. 14.

Referring to FIG. 15, the support device 10 displays a screen 1150 on the display 157. The screen 1150 displays only a variable in which the problem of the tag has not been solved in a display region 1151. According to such display, the user can know that a tag name set in the tag set is wrong.

The support device 10 may be configured such that all the variable are displayed in the display region 1151 when the support device 10 accepts a switching manipulation from the user.

Figure 16:
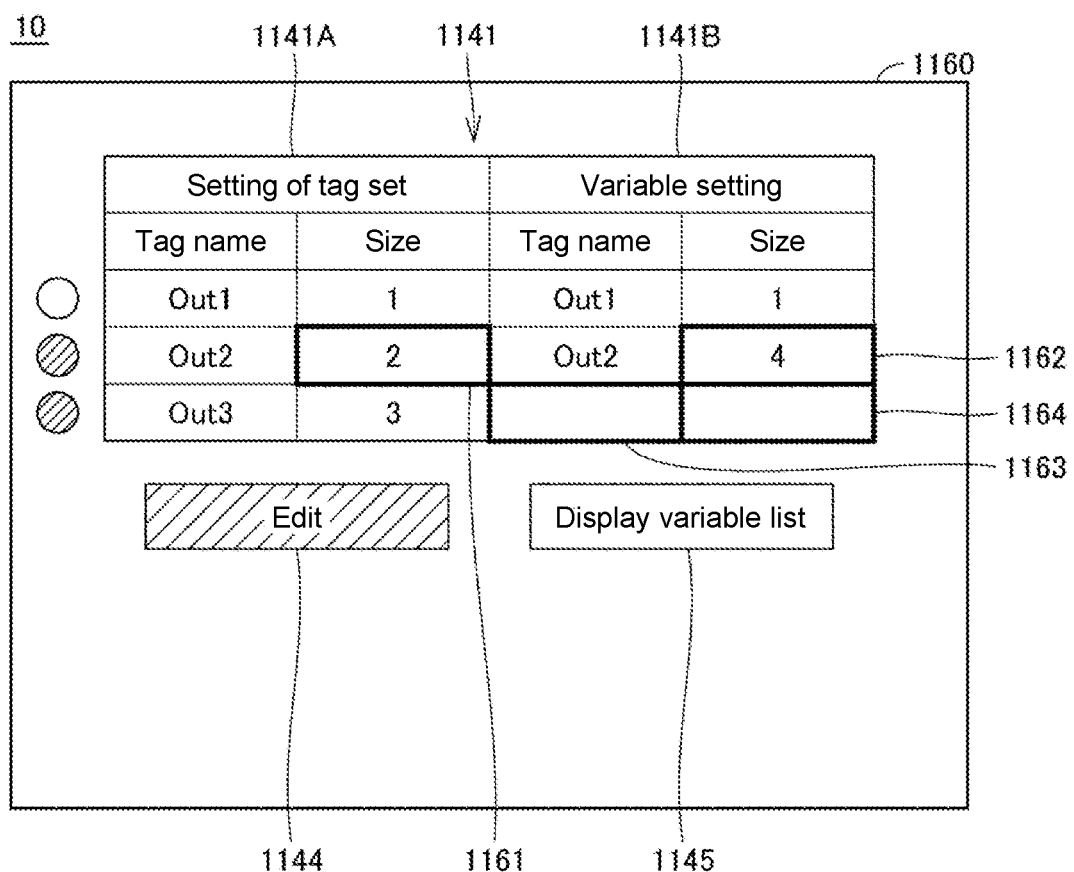
FIG. 16 is a diagram illustrating a screen displayed when the object image is selected on the screen of FIG. 14.

FIG. 16 is a diagram illustrating a screen displayed when the object image 1144 is selected on the screen 1140 of FIG. 14.

Referring to FIG. 16, the support device 10 accepts a data input regarding a position inconsistent on the screen 1150 of FIG. 15. When the data input is accepted and then a selection of a setting update button (a saving button) (not illustrated) is accepted, the support device 10 updates the first setting information D11 and the second setting information D12 based on the input data.

In the configuration, the user can easily solve the inconsistency of the data. That is, in this case, the user can easily solve the problem of the tag.

(2) Second Case

Figure 17:
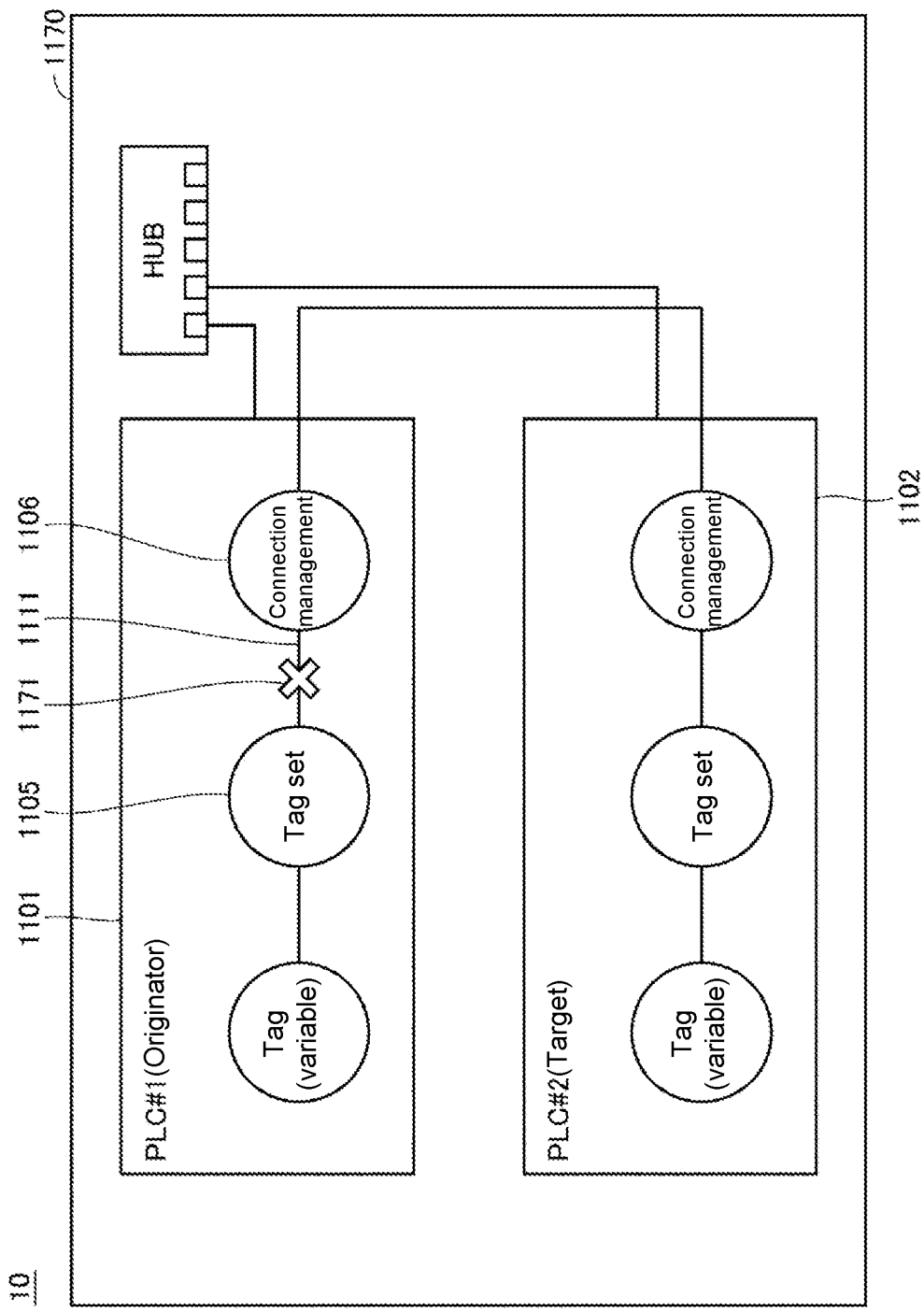
FIG. 17 is a diagram illustrating another screen displayed by the support device when a problem of a tag has not been solved.

FIG. 17 is a diagram illustrating another screen displayed by the support device 10 when a problem of a tag has not been solved. Specifically, FIG. 17 illustrates a screen example of a case in which there is no consistency between the second setting information D12 and the connection information D3 of the PLC 30A of the originator side, as illustrated in FIG. 11.

Referring to FIG. 17, since there is no consistency between the second setting information D12 and the connection information D3, the support device 10 displays an object image 1171 (in this example, a sign such as a x mark) on the line segment image 1111 connecting the object image 1105 to the object image 1107.

Through such display, the user can know that the problem of the tag has not been solved on the PLC 30A side.

Figure 18:
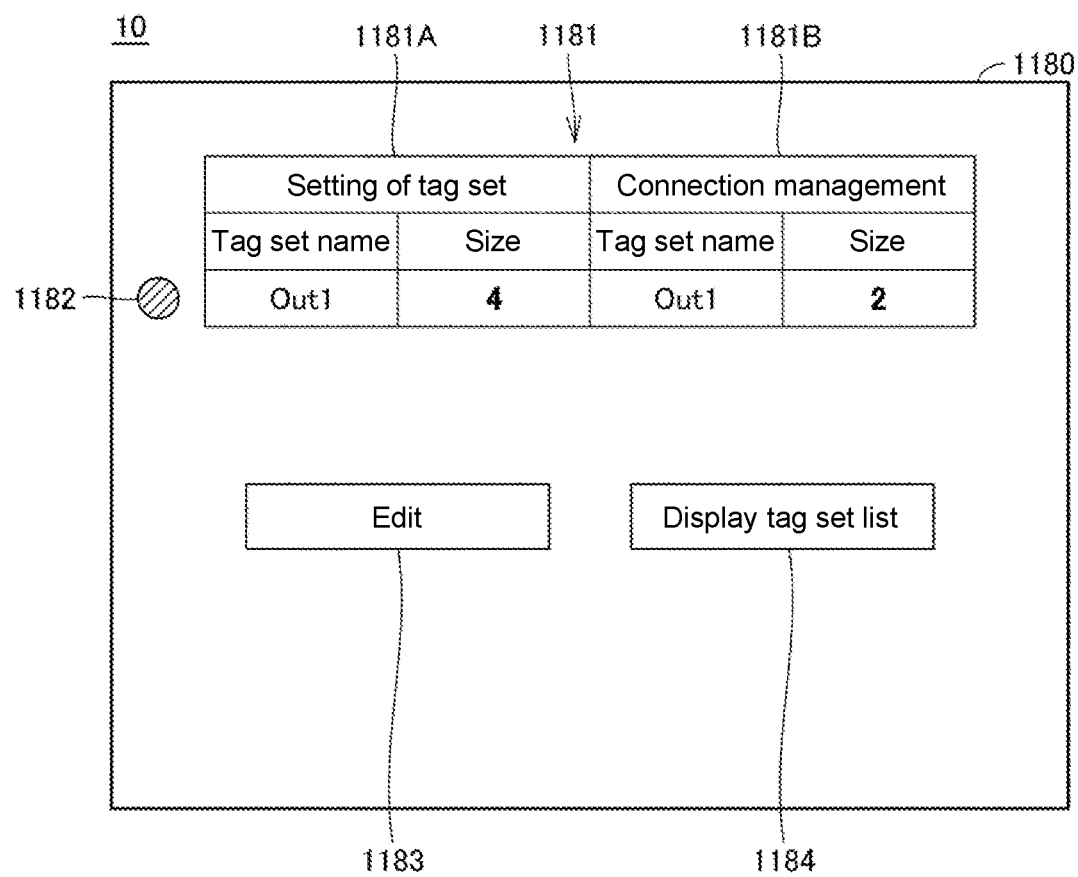
FIG. 18 is a diagram illustrating a screen displayed when the support device receives a manipulation of selecting the object image.

FIG. 18 is a diagram illustrating a screen displayed when the support device 10 receives a manipulation of selecting the object image 1171.

Referring to FIG. 18, the support device 10 displays a screen 1180 on the display 157. The screen 1180 includes a data table 1181 and object images 1182, 1183, and 1184. The data table 1181 includes a table 1181A indicating the second setting information D12 and a table 1181B indicating the connection information D3.

In the table 1181A, a name of a tag set generated through a manipulation of generating the second setting information D12 (setting of the tag set) and a data size of the tag set associated with the name of the tag set are displayed.

In the table 1181B, the name of each tag set through a manipulation of generating the connection information D3 and a data size of the tag set associated with the name of the tag set are displayed.

In the case of this example, since a data size of a tag set "Out1" of the setting of the tag set does not match a data size of the tag set "Out1" of the connection management (the connection information D3), the support device 10 displays an object image 1182 indicating abnormality to the left of such data.

In this way, according to the screen 1180, the user can easily know that the problem of the tag has not been solved due to a certain cause (specifically, what is not consistent) with regard to the setting of the tag set.

Figure 19:
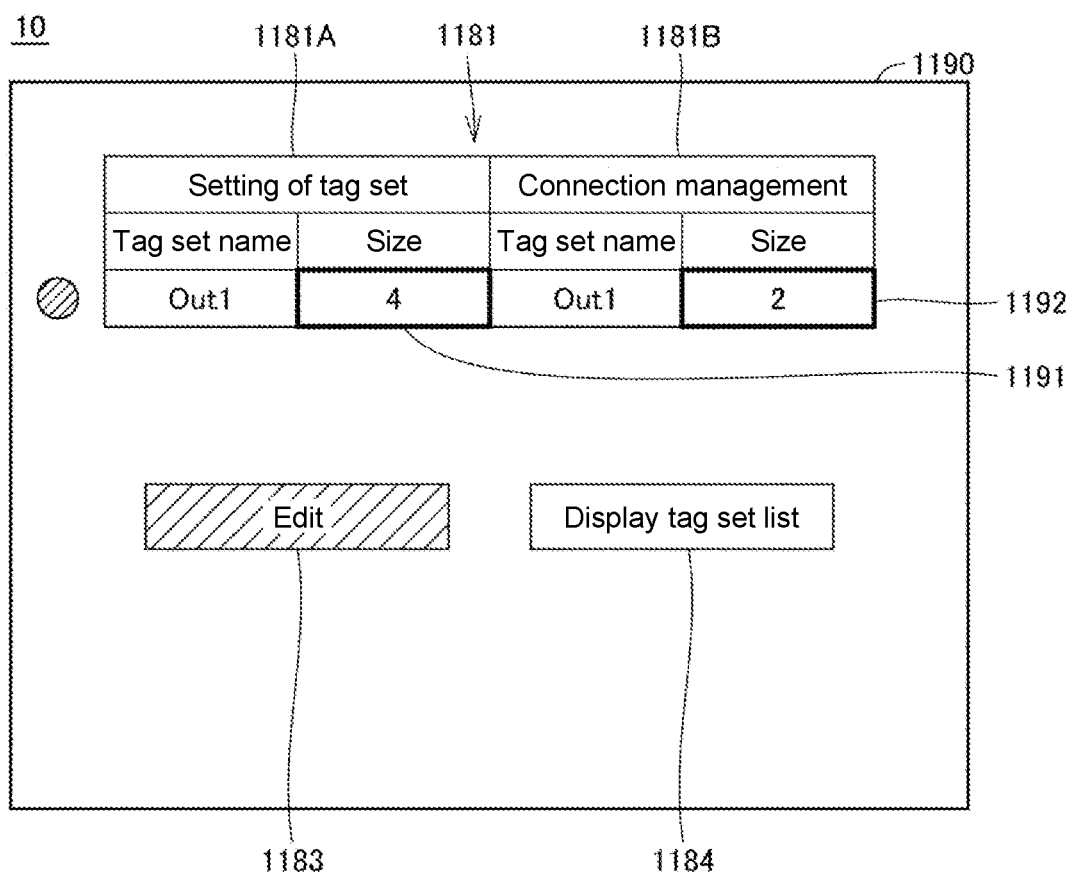
FIG. 19 is a diagram illustrating a screen displayed when the object image is selected on the screen of FIG. 18.

FIG. 19 is a diagram illustrating a screen displayed when the object image 1183 is selected on the screen 1180 of FIG. 18.

Referring to FIG. 19, the support device 10 accepts a data input regarding a position inconsistent on the screen 1180 of FIG. 18. When the data input is accepted and then a selection of a setting update button (a saving button) (not illustrated) is accepted, the support device 10 updates the second setting information D12 and the connection information D3 based on the input data.

In the configuration, the user can easily solve the inconsistency of the data. That is, in this case, the administrator can easily solve the problem of the tag (specifically, the tag set).

(3) Third Case

Figure 20:
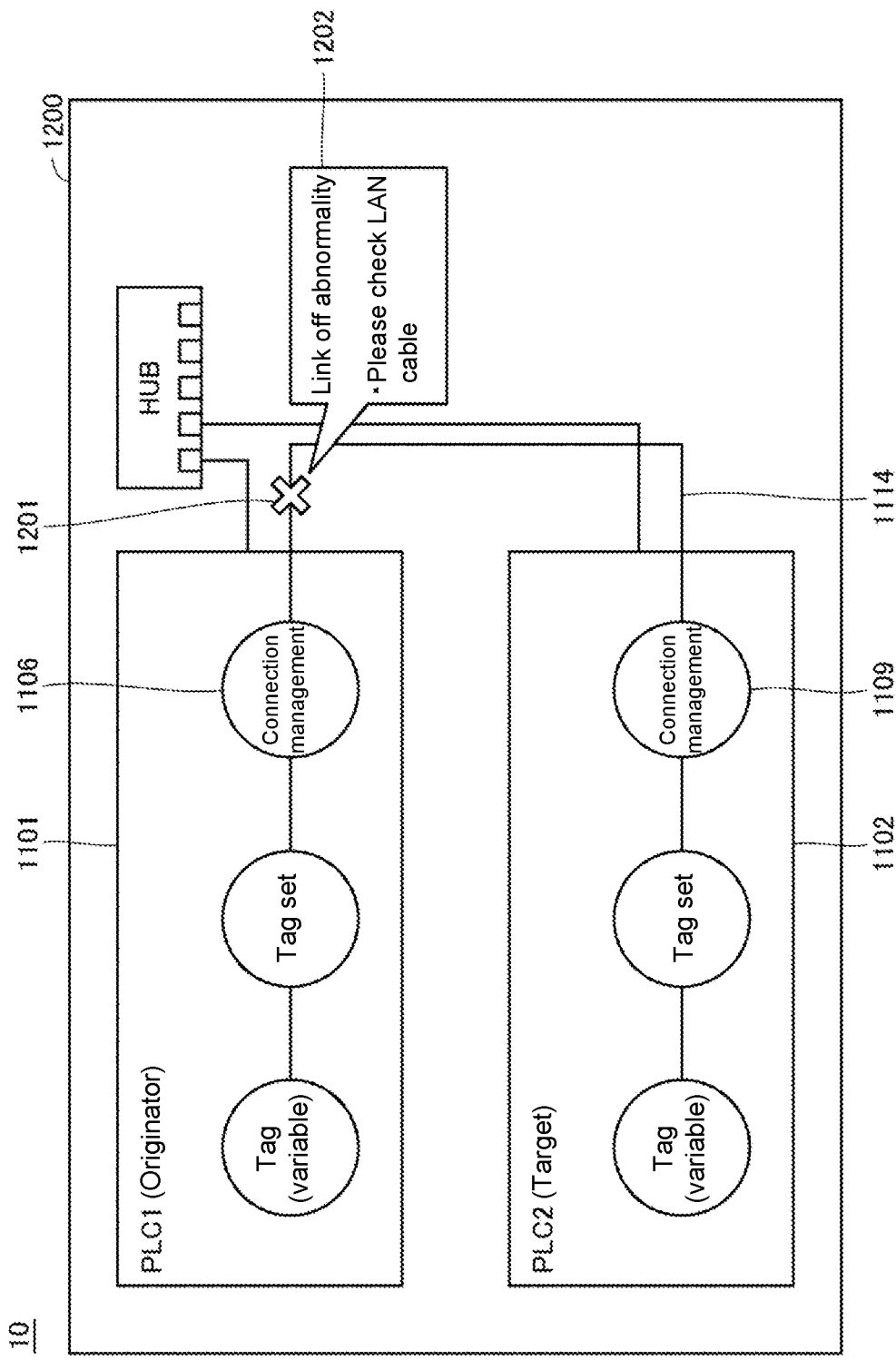
FIG. 20 is a diagram illustrating a screen 1200 displayed by the support device when establishment of a connection has failed.

FIG. 20 is a diagram illustrating a screen 1200 displayed by the support device 10 when establishment of a connection has failed. Specifically, FIG. 20 illustrates a screen displayed on the support device 10 when link OFF abnormality (a state in which a link is turned off) occurs. The "Link OFF" can typically occur when a LAN cable is not normally connected to the PLC 30A of the originator side.

Referring to FIG. 20, since the link OFF abnormality occurs, the support device 10 displays an object image 1201 (in this example, a sign such as a x mark) on the line segment image 1114 connecting the object image 1106 to the object image 1109. Typically, the object image 1201 is displayed on the PLC 30A side which is the originator rather than the PLC 30B which is the target.

Further, the support device 10 displays a predetermined message near the object image 1201. For example, the support device 10 displays a message indicating the link OFF abnormality and a message for urging checking of the LAN cable.

Through such display, the user can know that the establishment of the connection has failed due to defective setting on the PLC 30A side.

(4) Fourth Case

Figure 21:
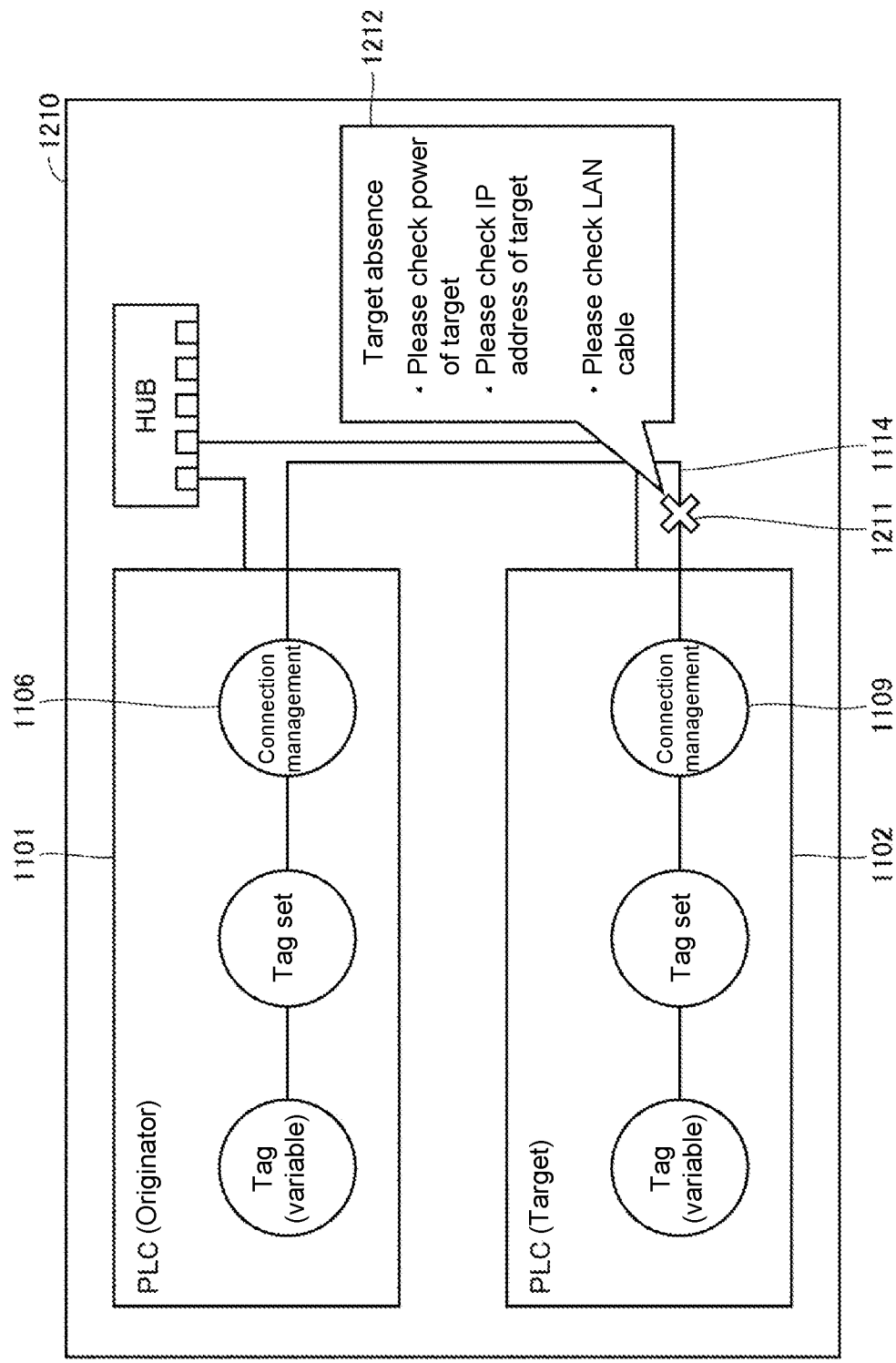
FIG. 21 is a diagram illustrating another screen displayed by the support device when establishment of a connection has failed.

FIG. 21 is a diagram illustrating another screen displayed by the support device 10 when establishment of a connection has failed. Specifically, FIG. 21 illustrates a screen displayed on the support device 10 when target absence (a state in which the PLC 30 as a target is absent) occurs. The "target absence" can typically occur when power of the PLC 30B of the target side is turned off, setting of an IP address of the target is wrong, or a LAN cable is not normally connected to the PLC 30B of the target side.

Referring to FIG. 21, since a situation of the target absence occurs, the support device 10 displays an object image 1211 (in this example, a sign such as a x mark) on the line segment image 1114 connecting the object image 1106 to the object image 1109. Typically, the object image 1211 is displayed on the PLC 30B side which is the target rather than the PLC 30A which is the originator.

Further, the support device 10 displays a predetermined message near the object image 1211. For example, the support device 10 displays a message indicating the target absence and a message for urging execution of work for solving the abnormality (execution of work for checking a position which can be considered to be defective).

Through such display, the user can know that the establishment of the connection has failed due to defective setting on the PLC 30B side.

(5) Fifth Case

Figure 22:
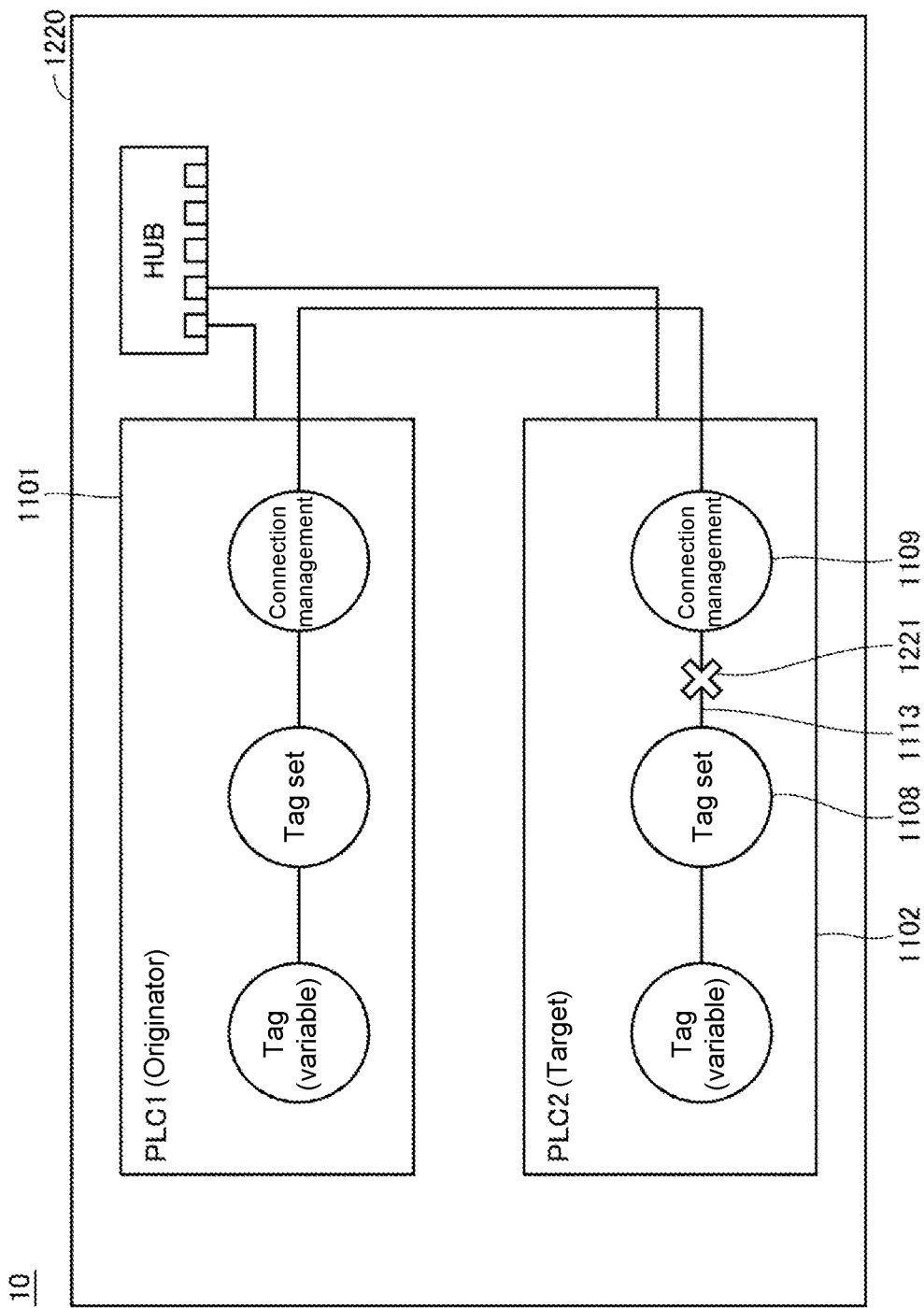
FIG. 22 is a diagram illustrating still another screen displayed by the support device when a problem of a tag has not been solved.

FIG. 22 is a diagram illustrating still another screen displayed by the support device 10 when a problem of a tag has not been solved. Specifically, FIG. 22 illustrates a screen example of a case in which there is no consistency between the second setting information D22 and the connection information D3 of the PLC 30B of the target side, as illustrated in FIG. 11. More specifically, FIG. 22 illustrates a screen example when there is no tag set (no setting) in the PLC 30B which is the target side.

Referring to FIG. 22, since there is no consistency between the second setting information D22 and the connection information D3, the support device 10 displays an object image 1221 (in this example, a sign such as a x mark) on the line segment image 1113 connecting the object image 1108 to the object image 1109.

Through such display, the user can know that the problem of the tag has not been solved (specifically, there is no tag set in the PLC 30 which is the target side).

Figure 23:
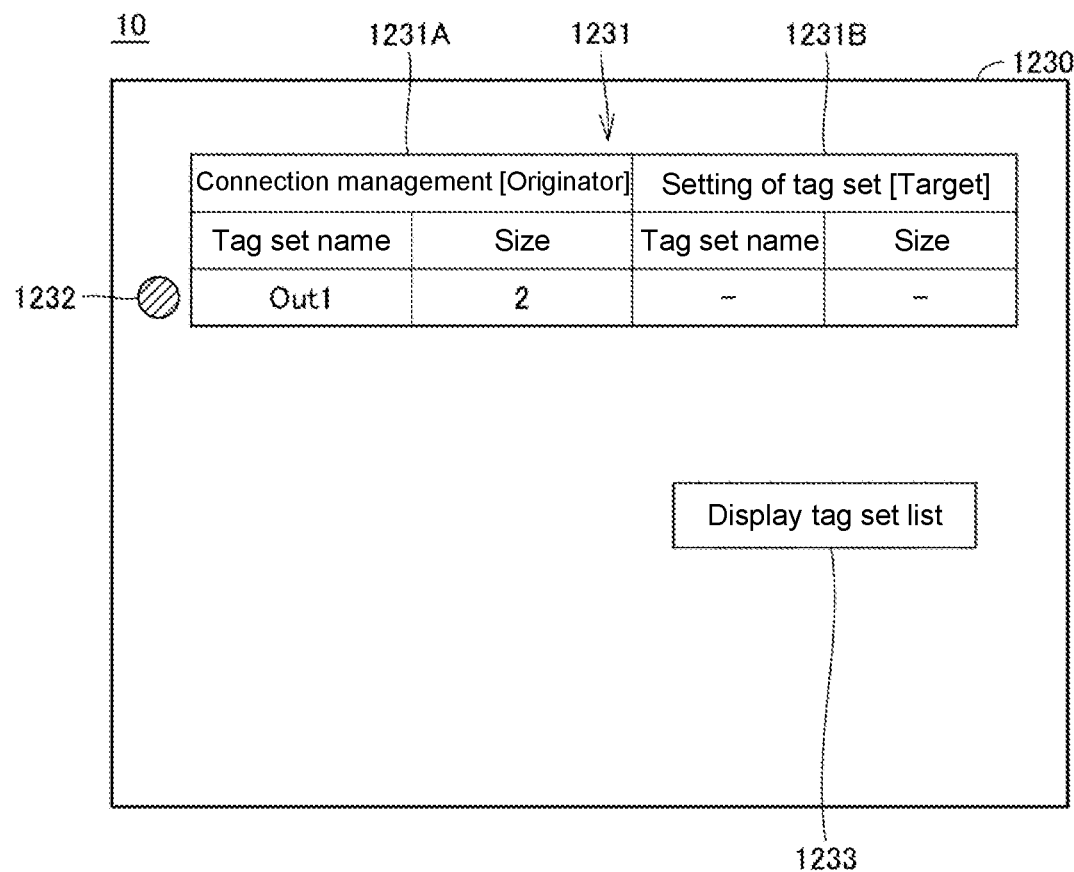
FIG. 23 is a diagram illustrating a screen displayed when the support device receives a manipulation of selecting the object image.

FIG. 23 is a diagram illustrating a screen displayed when the support device 10 receives a manipulation of selecting the object image 1221 (see FIG. 22).

Referring to FIG. 23, the support device 10 displays a screen 1230 on the display 157. The screen 1230 includes a data table 1231 and object images 1232 and 1233. The data table 1231 includes a table 1231A indicating the connection information D3 and a table 1231B indicating the second setting information D22.

In the table 1231A, the name of a tag set set through a manipulation of generating the connection information D3 and a data size of the tag set associated with the name of the tag set are displayed.

In the table 1231B, the name of the tag set generated through a manipulation of generating the second setting information D22 (setting of the tag set) and a data size of the tag set associated with the name of the tag set are displayed. In the case of this example, since the tag set is not set in the target, data in the table 1231B is not described.

In the case of this example, since there is no tag set of the target side corresponding to a tag set "Out1" of the connection management, the support device 10 displays the object image 1232 indicating abnormality to the left of the tag set "Out1."

In this way, according to the screen 1230, the user can easily know that the problem of the tag has not been solved due to a certain cause (specifically, what is not consistent) with regard to the setting of the tag set.

(c4. Control Structure)

Figure 24:
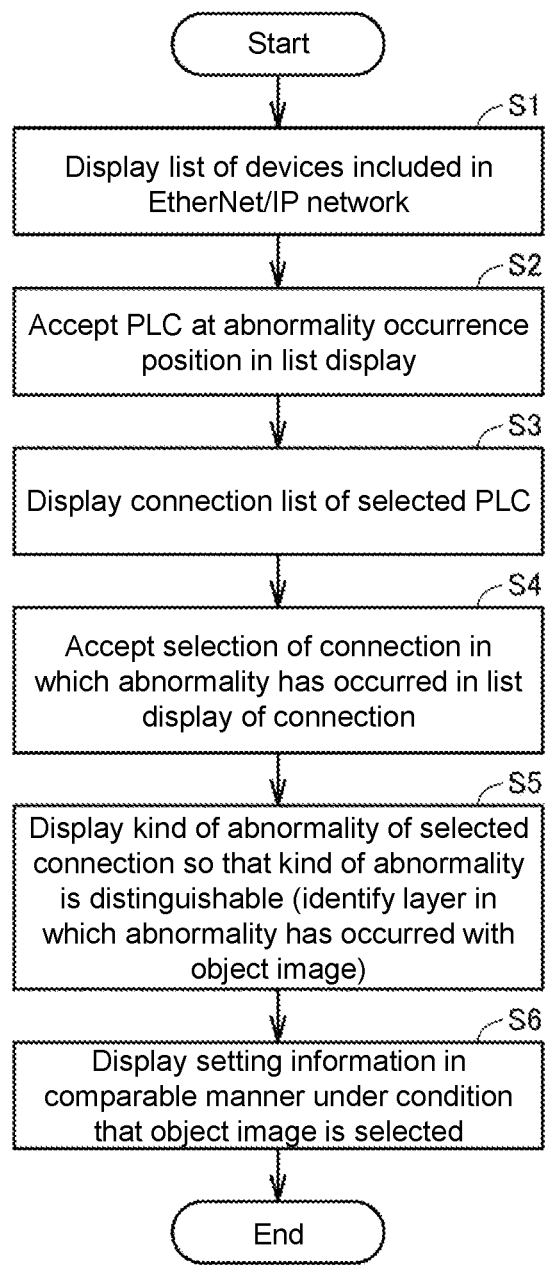
FIG. 24 is a flowchart illustrating a flow of a process in the support device.

FIG. 24 is a flowchart illustrating a flow of a process in the support device 10.

Referring to FIG. 24, in step S1, the support device 10 displays a list of devices included in an EtherNet/IP network (see FIG. 8). In step S2, the support device 10 accepts a manipulation of selecting the PLC 30 at an abnormality occurrence position (a highlighted position in FIG. 8) in the list display.

In step S3, the support device 10 displays a connection list of the selected PLC 30 (see FIG. 9). In step S4, the support device 10 accepts a manipulation of selecting the connection in which abnormality has occurred in the list display of the connection.

In step S5, the support device 10 displays a kind of abnormality of the selected connection so that the kind of abnormality is distinguishable. Specifically, the support device 10 identifies a position (layer) at which the abnormality has occurred as an object image. For example, the position at which the abnormality has occurred is displayed so that the position can be viewed by displaying an object image such as a x mark on the line segment image 1110, 1111, 1112, 1113, or the like on a screen 1130 of FIG. 13, a screen 1170 of FIG. 17, the screen 1200 of FIG. 20, a screen 1210 of FIG. 21, or a screen 1220 of FIG. 22.

In step S6, the support device 10 displays the setting information (in this example, D11, D12, D21, D22, and D3) in a comparable manner under the condition that the object image is selected (see FIG. 14, 18, or 23).

Through such display, a communication error cause can be easily identified in the network system 1 in which frame data (a tag set) is exchanged between the PLCs 30 in which the connection is set using EtherNet/IP.

<Supplements>

The network system 1 may also have the following configuration according to certain aspects. The reference numerals in parentheses are exemplary and the present disclosure is not limited thereto. For example, one communication control unit may be not the communication control unit 310A but the communication control unit 310B.

[1] A Network System (1) including:
  a plurality of control devices (30); and
  an information processing device (10),
    wherein each of the plurality of control devices (30) includes a communication control unit (310A, 310B, . . . ) that executes communication using EtherNet/IP and a state value management unit (311A, 311B, . . . ) that is connected to the communication control unit and manages a state value,
    wherein, of the plurality of communication control units (310A, 310B, . . . ), each of a pair of communication control units (310A and 310B) set to communicate with each other by opening a connection is configured to execute data processing of at least one of reading of a state value stored in the state value management unit (311A, 311B) connected to the communication control unit (310A, 310B) and writing of a state value on the state value management unit (311A, 311B) based on first setting information (D11, D21) set for the communication control unit,
    wherein each of the pair of communication control units (310A, 310B) is configured to execute exchange of frame data (a tag set) including the state value with a communication control unit (310A, 310B) of a communication partner based on second setting information (D12, D22) set for the communication control unit and connection information for opening the connection,
    wherein the first setting information (D11, D21) and the second setting information (D12, D22) are individually generated for each of the pair of communication control units (310A, 310B) in the information processing device (10) and transmitted from the information processing device (10) to each of the pair of communication control units (310A, 310B),
    wherein, when at least one communication control unit (310A) in the pair of communication control units (310A, 310B) has failed the data processing, the information processing device (10) displays the first setting information (D11) of the one communication control unit (310A) and the second setting information (D12) of the one communication control unit (310A) in a comparable manner on a display (157), and
    wherein, when the pair of communication control units (310A, 310B) have failed the exchange of the frame data, the information processing device (10) displays the second setting information (D12) of one communication control unit (310A) in the pair of communication control units (310A, 310B) and the connection information in a comparable manner on the display (157).

[2] The Network System (1) according to [1],
    wherein, when at least one communication control unit (310A) in the pair of communication control units (310A, 310B) has failed the data processing, the one communication control unit (310A) writes flag information indicating failure of the data processing on the state value management unit (311A) connected to the one communication control unit (310A),
    wherein, when the pair of communication control units (310A, 310B) have failed the exchange of the frame data, at least one communication control unit (310A) in the pair of communication control units (310A, 310B) writes flag information indicating the failure of the exchange of the frame data on the state value management unit (311A) connected to the one communication control unit (310A), and
    wherein the information processing device (10) acquires the flag information from the state value management unit (311A) and displays the first setting information (D11) of the one communication control unit (310A) and the second setting information (D12) of the one communication control unit (310A) in a comparable manner on the display (157) when the failure of the data processing is detected based on the flag information, and the information processing device (10) displays the second setting information (D12) of the one communication control unit (310A) and the connection information in a comparable manner on the display (157) when the failure of the exchange of the frame data is detected based on the flag information.

[3] The Network System (1) according to [1] or [2],
    wherein the frame data includes a plurality of sub-frames (tags), and
    wherein, when the failure of the data processing is detected, the information processing device (10) displays names of variables considered to be the sub-frames and data sizes of the variables as the first setting information (D11) of the one communication control unit (310A) and displays names of the sub-frames and data sizes of the sub-frames as the second setting information of the one communication control unit (310A).

[4] The Network System (1) according to [2] or [3],
wherein, when the failure of the exchange of the frame data is detected, the information processing device (10) displays a name of the frame data and a data size of the frame data as the second setting information (D12) of the one communication control unit (310A), and
wherein the connection information includes the name of the frame data and the data size of the frame data.

[5] The Network System (1) according to [2],
wherein the information processing device (10) displays a list of the plurality of control devices (30) on the display (157), and
wherein, when it is detected that the one communication control unit (310A) has failed the data processing, the information processing device (10) displays a first control device (30A) including the one communication control unit (310A) among the plurality of control devices (30) in the list in a different mode from the other control devices (30) on the display (157).

[6] The network system (1) according to [5], wherein, when it is detected that the one communication control unit (310A) has failed the data processing, the information processing device (10) displays the first control device (30A) including the one communication control unit (310A) and a second control device (30B) including the other communication control unit (310B) paired with the one communication control unit (310A) among the plurality of control devices (30) in the list in a different mode from the other control devices (30) on the display (157).

[7] The network system (1) according to [5], wherein, when it is detected that the one communication control unit (310A) has failed the exchange of the frame data, the information processing device (10) displays the first control device (30A) in the list in a different mode from the other control devices (30) on the display (157).

[8] The Network System (1) according to [7],
wherein, based on selection of the first control device (30A) including the one communication control unit (310A), the information processing device (10) displays a first screen (1130, 1170, 1220) including the first control device (30A) and a second control device (30B) including the other communication control unit (310B) paired with the one communication control unit (310A) among the plurality of control devices (30) on the display (157), and
wherein, based on the flag information, the information processing device displays the first screen (1130, 1170, 1220) such that whether the failure is the failure of the data processing or the failure of the exchange of the frame data is distinguishable.

[9] The network system (1) according to [8], wherein the information processing device (10) displays a pre-decided message (1202) when it is detected that a link between the first control device (30A) and the second control device (30B) is in an OFF state.

[10] The network system (1) according to [9], wherein the information processing device (10) displays a pre-decided message (1212) when the second control device (30B) is not findable.

[11] The network system (1) according to [10], wherein the information processing device (10) changes a display position of an object image (1131, 1171, 1221) indicating occurrence of abnormality on the first screen (1130, 1170, 1220) in a case of the failure of the data processing, a case of the failure of the exchange of the frame data, a case of the OFF state of the link, and a case in which the control device is not findable.

[12] The Network System (1) according to any one of [1] to [11],
wherein, when the failure of the data processing is detected, the information processing device (10) displays a second screen (1160) for changing the second setting information (D12) of the one communication control unit (310A) on the display (157) based on reception of a pre-decided manipulation, and
wherein, when the failure of the exchange of the frame data is detected, the information processing device (10) displays a third screen (1190) for changing the second setting information (D12) of the one communication control unit (310A) on the display (157) based on reception of a pre-decided manipulation.

The support device 10 which is an example of an information processing device may also have the following configuration.

[13] An Information Processing Device (10) Capable of Communicating with each of a Plurality of Control Devices (30),
wherein each of the plurality of control devices (30) includes a communication control unit (310A, 310B, ...) that executes communication using EtherNet/IP and a state value management unit (311A, 311B, ...) that is connected to the communication control unit (310A, 310B, ...) and manages a state value,
wherein, of the plurality of communication control units (310A, 310B, ...), each of a pair of communication control units (310A, 310B) set to communicate with each other by opening a connection is configured to execute data processing of at least one of reading of a state value stored in the state value management unit (311A, 311B) connected to the communication control unit (310A, 310B) and writing of a state value on the state value management unit (311A, 311B) based on first setting information (D11, D21) set for the communication control unit and is configured to execute exchange of frame data including the state value with a communication control unit (310A, 310B) of a communication partner based on second setting information (D12, D22) set for the communication control unit and connection information for opening the connection, and
wherein the information processing device (10) includes:
a generation unit (111) configured to individually generate the first setting information (D11, D21) and the second setting information (D12, D22) for each of the pair of communication control units;
a transmission unit (120) configured to transmit the generated first setting information (D11, D21) and second setting information (D12, D22) to each of the pair of communication control units (310A, 310B); and
a display control unit (113) configured to display, when at least one communication control unit (310A) in the pair of communication control units (310A, 310B) has failed the data processing, the first setting information (D11) of the one communication control unit (310A) and the second setting information (D12) of the one communication control unit (310A) in a comparable manner on the display (157), and configured to display, when the pair of communication control units (310A, 310B) have failed the exchange of the frame data, the second setting information (D12) of one communication control unit (310A) in the pair of communication control units (310A, 310B) and the connection information in a comparable manner on the display (157).

[14] An Information Processing Method in an Information Processing Device (10) capable of Communicating with each of a Plurality of Control Devices (30),
- wherein each of the plurality of control devices (30) includes a communication control unit (310A, 310B, . . . ) that executes communication using EtherNet/IP and a state value management unit (311A, 311B, . . . ) that is connected to the communication control unit (310A, 310B, . . . ) and manages a state value,
- wherein, of the plurality of communication control units (310A, 310B, . . . ), each of a pair of communication control units (310A, 310B) set to communicate with each other by opening a connection is configured to execute data processing of at least one of reading of a state value stored in the state value management unit (311A, 311B) connected to the communication control unit (310A, 310B) and writing of a state value on the state value management unit (311A, 311B) based on first setting information (D11, D21) set for the communication control unit and is configured to execute exchange of frame data including the state value with a communication control unit (310A, 310B) of a communication partner based on second setting information (D12, D22) set for the communication control unit and connection information for opening the connection, and
- wherein the information processing method includes:
- a step of individually generating the first setting information (D11, D21) and the second setting information (D12, D22) for each of the pair of communication control units (310A, 310B);
- a step of transmitting the generated first setting information (D11, D21) and second setting information D12, D22) to each of the pair of communication control units (310A, 310B);
- a step of displaying, when at least one communication control unit (310A) in the pair of communication control units (310A, 310B) has failed the data processing, the first setting information (D11) of the one communication control unit (310A) and the second setting information (D12) of the one communication control unit (310A) in a comparable manner on the display (157); and
- a step of displaying, when the pair of communication control units (310A, 310B) have failed the exchange of the frame data, the second setting information (D12) of one communication control unit (310A) in the pair of communication control units (310A, 310B) and the connection information in a comparable manner on the display (157).

The embodiments disclosed above are exemplary in all the respects and are not considered to be limited. The scope of the present disclosure is indicated in the claims rather than the foregoing description of the embodiment and is intended to include equivalent meanings to those of the claims and all the changes in the scope.

What is claimed is:

1. A network system comprising:
   a plurality of control devices; and
   an information processing device,
   wherein each of the plurality of control devices includes a communication control unit that executes communication using EtherNet/IP and a state value management unit that is connected to the communication control unit and manages a state value,
   wherein, of the plurality of communication control units, each of a pair of communication control units set to communicate with each other by opening a connection is configured to execute data processing of at least one of reading of a state value stored in the state value management unit connected to the communication control unit and writing of a state value on the state value management unit based on first setting information set for the communication control unit,
   wherein each of the pair of communication control units is configured to execute exchange of frame data including the state value with a communication control unit of a communication partner based on second setting information set for the communication control unit and connection information for opening the connection,
   wherein the first setting information and the second setting information are individually generated for each of the pair of communication control units in the information processing device and transmitted from the information processing device to each of the pair of communication control units,
   wherein, when at least one communication control unit in the pair of communication control units has failed the data processing, the information processing device displays the first setting information of the one communication control unit and the second setting information of the one communication control unit in a comparable manner on a display, and
   wherein, when the pair of communication control units have failed the exchange of the frame data, the information processing device displays the second setting information of one communication control unit in the pair of communication control units and the connection information in a comparable manner on the display.

2. The network system according to claim 1,
   wherein, when at least one communication control unit in the pair of communication control units has failed the data processing, the one communication control unit writes flag information indicating failure of the data processing on the state value management unit connected to the one communication control unit,
   wherein, when the pair of communication control units have failed the exchange of the frame data, at least one communication control unit in the pair of communication control units writes flag information indicating the failure of the exchange of the frame data on the state value management unit connected to the one communication control unit, and
   wherein the information processing device acquires the flag information from the state value management unit and displays the first setting information of the one communication control unit and the second setting information of the one communication control unit in a comparable manner on the display when the failure of the data processing is detected based on the flag information, and the information processing device displays the second setting information of the one communication control unit and the connection information in a comparable manner on the display when the failure of the exchange of the frame data is detected based on the flag information.

3. The network system according to claim 2,
   wherein, when the failure of the exchange of the frame data is detected, the information processing device displays a name of the frame data and a data size of the frame data as the second setting information of the one communication control unit, and wherein the connection information includes the name of the frame data and the data size of the frame data.

4. The network system according to claim 1, wherein the frame data includes a plurality of sub-frames, and
wherein, when the failure of the data processing is detected, the information processing device displays names of variables considered to be the sub-frames and data sizes of the variables as the first setting information of the one communication control unit and displays names of the sub-frames and data sizes of the sub-frames as the second setting information of the one communication control unit.

5. The network system according to claim 2, wherein the information processing device displays a list of the plurality of control devices on the display, and
wherein, when it is detected that the one communication control unit has failed the data processing, the information processing device displays a first control device including the one communication control unit among the plurality of control devices in the list in a different mode from the other control devices on the display.

6. The network system according to claim 5, wherein, when it is detected that the one communication control unit has failed the data processing, the information processing device displays the first control device including the one communication control unit and a second control device including the other communication control unit paired with the one communication control unit among the plurality of control devices in the list in a different mode from the other control devices on the display.

7. The network system according to claim 5, wherein, when it is detected that the one communication control unit has failed the exchange of the frame data, the information processing device displays the first control device in the list in a different mode from the other control devices on the display.

8. The network system according to claim 7, wherein, based on selection of the first control device including the one communication control unit, the information processing device displays a first screen including the first control device and a second control device including the other communication control unit paired with the one communication control unit among the plurality of control devices on the display, and
wherein, based on the flag information, the information processing device displays the first screen such that whether the failure is the failure of the data processing or the failure of the exchange of the frame data is distinguishable.

9. The network system according to claim 8, wherein the information processing device displays a pre-decided message when it is detected that a link between the first and second control devices is in an OFF state.

10. The network system according to claim 9, wherein the information processing device displays a pre-decided message when the second control device is not findable.

11. The network system according to claim 10, wherein the information processing device changes a display position of an object image indicating occurrence of abnormality on the first screen in a case of the failure of the data processing, a case of the failure of the exchange of the frame data, a case of the OFF state of the link, and a case in which the control device is not findable.

12. The network system according to claim 1, wherein, when the failure of the data processing is detected, the information processing device displays a second screen for changing the second setting information of the one communication control unit on the display based on reception of a pre-decided manipulation, and
wherein, when the failure of the exchange of the frame data is detected, the information processing device displays a third screen for changing the second setting information of the one communication control unit on the display based on reception of a pre-decided manipulation.

13. An information processing device capable of communicating with each of a plurality of control devices,
wherein each of the plurality of control devices includes a communication control unit that executes communication using EtherNet/IP and a state value management unit that is connected to the communication control unit and manages a state value,
wherein, of the plurality of communication control units, each of a pair of communication control units set to communicate with each other by opening a connection is configured to execute data processing of at least one of reading of a state value stored in the state value management unit connected to the communication control unit and writing of a state value on the state value management unit based on first setting information set for the communication control unit and is configured to execute exchange of frame data including the state value with a communication control unit of a communication partner based on second setting information set for the communication control unit and connection information for opening the connection, and
wherein the information processing device comprises:
a generation unit configured to individually generate the first setting information and the second setting information for each of the pair of communication control units;
a transmission unit configured to transmit the generated first setting information and second setting information to each of the pair of communication control units; and
a display control unit configured to display, when at least one communication control unit in the pair of communication control units has failed the data processing, the first setting information of the one communication control unit and the second setting information of the one communication control unit in a comparable manner on the display, and configured to display, when the pair of communication control units have failed the exchange of the frame data, the second setting information of one communication control unit in the pair of communication control units and the connection information in a comparable manner on the display.

14. An information processing method in an information processing device capable of communicating with each of a plurality of control devices,
wherein each of the plurality of control devices includes a communication control unit that executes communication using EtherNet/IP and a state value management unit that is connected to the communication control unit and manages a state value,
wherein, of the plurality of communication control units, each of a pair of communication control units set to communicate with each other by opening a connection is configured to execute data processing of at least one of reading of a state value stored in the state value management unit connected to the communication control unit and writing of a state value on the state value management unit based on first setting information set for the communication control unit and is configured to execute exchange of frame data including the state value with a communication control unit of a communication partner based on second setting information set for the communication control unit and connection information for opening the connection, and wherein the information processing method comprises:

a step of individually generating the first setting information and the second setting information for each of the pair of communication control units;

a step of transmitting the generated first setting information and second setting information to each of the pair of communication control units;

a step of displaying, when at least one communication control unit in the pair of communication control units has failed the data processing, the first setting information of the one communication control unit and the second setting information of the one communication control unit in a comparable manner on the display; and a step of displaying, when the pair of communication control units have failed the exchange of the frame data, the second setting information of one communication control unit in the pair of communication control units and the connection information in a comparable manner on the display.

* * * * *